(12) United States Patent
Tobiason et al.

(10) Patent No.: US 7,433,052 B2
(45) Date of Patent: Oct. 7, 2008

(54) SYSTEMS AND METHODS FOR TILT AND RANGE MEASUREMENT

(75) Inventors: Joseph D Tobiason, Woodinville, WA (US); David W Sesko, Woodinville, WA (US); Benjamin K Jones, Seattle, WA (US); Michelle M Milvich, Seattle, WA (US); Vidya Venkatachalam, Belleview, WA (US)

(73) Assignee: Mitutoyo Corporation, Kanagawa (JP)

( * ) Notice: Subject to any disclaimer, the term of this patent is extended or adjusted under 35 U.S.C. 154(b) by 70 days.

(21) Appl. No.: 11/175,271

(22) Filed: Jul. 7, 2005

(65) Prior Publication Data

US 2007/0008550 A1    Jan. 11, 2007

(51) Int. Cl.
*G01B 11/02* (2006.01)
(52) U.S. Cl. .................................................. 356/510
(58) Field of Classification Search ............... 356/499, 356/508–510, 512, 494, 496, 498
See application file for complete search history.

(56) References Cited

U.S. PATENT DOCUMENTS

| | | | | | |
|---|---|---|---|---|---|
| 3,090,279 | A | * | 5/1963 | Chisholm | 356/499 |
| 3,765,772 | A | * | 10/1973 | Willett | 356/510 |
| 4,113,388 | A | * | 9/1978 | Gates et al. | 356/508 |
| 4,330,212 | A | * | 5/1982 | Miller | 356/508 |
| 4,360,273 | A | * | 11/1982 | Thaxter | 356/509 |
| 4,624,569 | A | | 11/1986 | Kwon | |
| 4,678,324 | A | * | 7/1987 | De Witt | 356/4.09 |
| 4,907,280 | A | * | 3/1990 | Barney et al. | 382/323 |
| 4,943,157 | A | | 7/1990 | Reding | |
| 5,017,011 | A | * | 5/1991 | Lisson et al. | 356/508 |
| 5,035,281 | A | | 7/1991 | Neuenfeldt et al. | |
| 5,327,221 | A | * | 7/1994 | Saitoh et al. | 356/509 |
| 5,448,355 | A | * | 9/1995 | Noguchi et al. | 356/510 |
| 6,177,998 | B1 | | 1/2001 | Svetkoff et al. | |
| 6,239,878 | B1 | * | 5/2001 | Goldberg | 356/508 |
| 6,707,559 | B2 | * | 3/2004 | Ge | 356/512 |
| 6,768,544 | B1 | * | 7/2004 | Asemyr | 356/239.1 |
| 6,825,937 | B1 | | 11/2004 | Gebauer et al. | |

(Continued)

OTHER PUBLICATIONS

Akedo et al., "Point Source Diffraction and its Use in an Encoder," Nov. 15, 1988, Applied Optics, vol. 27, No. 22, pp. 4777-4781.*

(Continued)

*Primary Examiner*—Gregory J Toatley, Jr.
*Assistant Examiner*—Scott M Richey
(74) *Attorney, Agent, or Firm*—Oliff & Berridge, PLC

(57) ABSTRACT

A method of determining an amount of tilt may include projecting at least two coherent wavefronts toward a target surface, the wavefronts reflecting from the target surface to create an interference fringe pattern on a detector, and transmitting a beam toward the target surface, the transmitted beam reflecting from the target surface to form a beam spot on the detector. A fringe pitch indicative of a distance to the target surface may be determined based on the interference fringe pattern. A displacement on the detector of the beam spot, relative to a nominal location of the beam spot when the target surface is at a nominal angle of incidence relative to the beam, may be determined. The amount of tilt of the target surface relative to the nominal angle of incidence, may be determined based on the displacement of the beam spot and the determined fringe pitch.

20 Claims, 15 Drawing Sheets

U.S. PATENT DOCUMENTS

| | | | |
|---|---|---|---|
| 6,856,388 | B2 | 2/2005 | Schmidt |
| 6,864,964 | B2 | 3/2005 | Rheme et al. |
| 7,034,949 | B2 * | 4/2006 | Horwitz ..................... 356/512 |
| 7,245,384 | B2 * | 7/2007 | Ge et al. .................... 356/510 |
| 7,362,446 | B2 * | 4/2008 | Van Der Pasch et al. .... 356/499 |
| 2002/0113973 | A1 * | 8/2002 | Ge ............................. 356/510 |
| 2002/0163648 | A1 * | 11/2002 | Degertekin et al. ......... 356/499 |
| 2006/0238773 | A1 * | 10/2006 | Wellstead et al. ........... 356/510 |

OTHER PUBLICATIONS

O.I. Gorbenko, "Laser Determination of Structural Displacements by the Diffraction Method of Alignment Observations," Dec. 12, 1973, Power Technology and Engineering, vol. 7, Is. 12, pp. 1183-1185. (Translated from Gidrotekhnicheskoe Stroitel'stvo, No. 12, pp. 41-43, Dec. 1973).*

U.S. Appl. No. 10/808,849, filed Mar. 25, 2004, Tobiason et al.

Seung-Woo Kim et al; "Two-point Diffraction Interferometer for Absolute Distance Measurement"; Interferometry XII: Techniques and Analysis, Proceedings of SPIE vol. 5531, (SPIE, Bellingham, WA, 2004).

Seung-Woo Kim et al; "Point-Diffraction Interferometer for 3-D Profile Measurement of Rough Surfaces"; Proceedings of SPIE vol. 5191, Optical Diagnostics for Fluids, and Combustion II, (SPIE, Bellingham, WA, 2003).

* cited by examiner

SYSTEMS AND METHODS FOR TILT AND RANGE MEASUREMENT

BACKGROUND

This invention relates to tilt and range measurement of a target surface for determining, for example, x, y, z, pitch, yaw and/or roll of a two-dimensional scale surface.

Precision measuring systems are employed in a wide variety of fields. Many industrial systems and devices employ precision measuring systems for accurately positioning and orienting mechanical components. For example, machine tools, robots, printers, and multi-function devices employ precision measuring systems to accurately position and orient mechanical components.

Seung-Woo Kim et al. disclose a two-point diffraction interferometer for absolute distance measurement including tilt angle information in "Two-point Diffraction Interferometer for Absolute Distance Measurement," Interferometry XII: Techniques and Analysis, Proceedings of SPIE Vol. 5531 (SPIE, Bellingham, Wash., 2004). The two-point diffraction interferometer employs the spherical wavefronts that are output from the ends of two single mode fibers (SMF) that are split from a single laser source to generate an interference field or interference pattern throughout a measurement space. The interference pattern is detected directly on a detector array, which forms a sensor. Distance measurements between the fiber ends and the sensor along the X, Y and Z axes, as well as pitch, roll and/or yaw orientation of the detector array in the interference field, may be determined based on data detected by the detector array.

SUMMARY

The resolution of tilt measurements provided by such a known device is relatively low.

Embodiments employing one or more aspects of the invention are capable of providing pitch and/or tilt measurements with higher resolution and accuracy than known devices.

In exemplary embodiments, a method of determining an amount of tilt may include projecting at least two coherent wavefronts toward a target surface, the wavefronts reflecting from the target surface to create an interference fringe pattern on a detector, and transmitting a beam toward the target surface, the transmitted beam reflecting from the target surface to form a beam spot on the detector. A fringe pitch may be determined for at least a portion of the interference fringe pattern. The fringe pitch may be indicative of a distance to the target surface. The method may further include determining a displacement on the detector of the beam spot, relative to a nominal location of the beam spot when the target surface is at a nominal angle of incidence relative to the beam, and determining an amount of tilt of the target surface relative to the nominal angle of incidence, based on the determined displacement on the detector of the beam spot and the determined fringe pitch.

In exemplary embodiments, a readhead of a tilt sensor may include a light source configured to generate a light beam, a mask that includes a plurality of apertures, a beam splitter, a detector, and at least one signal connection to a signal processing and control circuit. In exemplary embodiments, the detector may provide signals to the signal processing and control circuit, which may be integrated with or located remotely from the readhead. The apertures may provide a plurality of coherent wavefronts when the mask is illuminated by the light source. The mask may be partially transmitting, and at least a portion of the light beam generated by the light source may be transmitted through the mask to a target surface. The beam splitter may be arranged to receive light reflected from the target surface. The beam splitter may direct light reflected from the target surface toward the detector. The light reflected by the beam splitter may include at least part of the pattern of interference fringes and at least part of the light beam transmitted through the mask. The light directed toward the detector may form a pattern of interference fringes arising from the coherent wavefronts and a beam spot arising from the light beam transmitted through the mask. The signal processing and control circuit may be configured to process data based on light received by the detector to determine a fringe pitch of at least a portion of the pattern of interference fringes and a location of the beam spot. The signal processing and control circuit may be further configured to determine an amount of tilt of the target surface based on the determined fringe pitch and the determined beam spot location.

In exemplary embodiments, a readhead of a tilt sensor may include a light source configured to generate a light beam that is directed toward a target surface, a plurality of respective optical fibers that input light from a light source and direct coherent wavefronts toward the target surface, a beam splitter arranged to receive light reflected from the target surface, a detector, and a signal processing and control circuit. The beam splitter may direct light reflected from the target surface toward the detector. The wavefronts may be reflected from the target surface to create a pattern of interference fringes on the detector and the light beam may be reflected from the target surface to form a beam spot on the detector. The signal processing and control circuit may be configured to process data based on the light received by the detector to determine a fringe pitch of at least a portion of the pattern of interference fringes and a location of the beam spot. The signal processing and control circuit may be further configured to determine an amount of tilt of the target surface based on the determined fringe pitch and the determined location of the beam spot.

These and other optional features and possible advantages of various aspects of this invention are described in, or are apparent from, the following detailed description of exemplary embodiments of systems and methods.

BRIEF DESCRIPTION OF THE DRAWINGS

Exemplary embodiments of the invention are described in detail with reference to the following figures, wherein.

DETAILED DESCRIPTION OF EMBODIMENTS

Throughout the following description, various exemplary structures are set forth to provide a thorough understanding of various aspects of the invention. Various aspects of the invention may be practiced without utilizing all of such exemplary structures. In some instances, well known elements are not shown or described in detail, for the sake of brevity and clarity.

In general, two or more closely spaced point or line sources of coherent light may produce an interference pattern with a fringe pitch that depends on a distance from the point or line sources at which the pattern is detected as well as a spacing between the sources. Two point or line sources may produce quasi-linear fringes. Three point sources, or four line sources, may produce an array of high and low intensity regions corresponding to the superposition of two linear fringe patterns. A measuring device may utilize such interference patterns to determine distance and/or displacement.

As discussed below, a distance between a readhead, containing the sources and a detector (e.g., camera), and a target surface may be calculated based on the fringe pitch of the pattern on the target surface. A location (e.g., centroid) of a central high intensity region of a beam transmitted to and reflected from the target surface may be detected to allow tilt to be measured as well. Displacements in x and y directions and yaw rotations may be measured, for example, when the target surface includes or is replaced by a phase or amplitude scale that provides detectable features in an image, in addition to the fringes and transmitted beam described herein.

Figure 1:
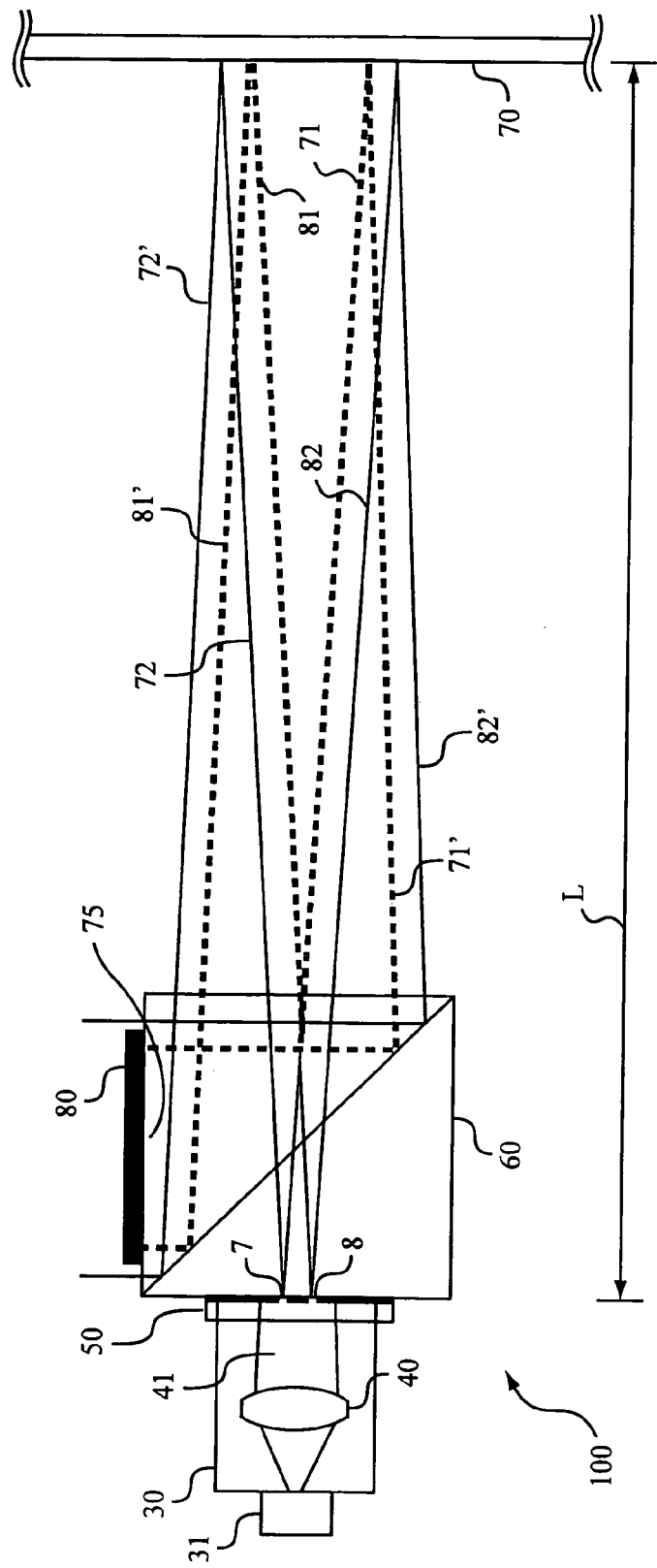
FIG. 1 is a diagram of an exemplary tilt sensor emphasizing the light transmitted from a light source that passes through two apertures in a mask.

FIG. 1 is a diagram of an exemplary tilt sensor 100 emphasizing light transmitted from a light source through two apertures 7, 8 in a mask 50. The apertures may comprise pinhole apertures, or slit apertures, as described in greater detail below. Pinhole apertures may act approximately as point sources, and may produce approximately spherical coherent wavefronts when illuminated by coherent light. Slit apertures may act approximately as line sources, and may produce approximately cylindrical coherent wavefronts when illuminated by coherent light. The exemplary tilt sensor 100 may include a signal processing and control circuit (not shown), a light source 30, the mask 50, a beam splitter 60, a target surface 70 and a detector 80. In exemplary embodiments, the target surface 70 may comprise a flat reflective surface, for example a mirror, a silicon wafer, etc. In exemplary embodiments, the light source 30 may comprise a laser 31, such as a HeNe laser or a laser diode. In some exemplary embodiments, as discussed below, the light source 30 may comprise a plurality of optical fibers coupled to a laser.

In exemplary embodiments, a lens 40 and/or other beam shaping optics, for example a GRIN lens, may be used to focus, concentrate and/or shape the light of the light source 30 into a beam 41. The lens 40 and/or other light shaping elements may be omitted in embodiments where the laser 31 and/or associated optics directly provide a beam 41 that is suitable for the sensing operations outlined further below. Focusing the light may help to slightly increase the overlap of the light diffraction from the two apertures 7, 8. In general, the greatest overlap between the light from the two apertures 7, 8, and thus the largest field of fringe visibility, may be near the beam focus plane. In exemplary embodiments, the tilt sensor may be configured such that the beam focus plane is approximately at the plane of the detector 80 for a nominal optical path length L between the apertures and the target surface. This may be primarily important for relatively larger apertures, that is, larger pinhole apertures or wider slit apertures. Relatively smaller apertures may generate a wider diffraction of the emitted light and may thus provide substantial overlap regardless of whether the beam 41 is focused or not.

When the tilt sensor 100 is operating, the light beam 41 may pass through respective apertures 7, 8 in the mask 50, to form two respective coherent wavefronts. The beam from the aperture 7 (i.e., the light passing through the aperture 7 in mask 50) to the target surface 70 is outlined by the lines 71-72 in FIG. 1, and the beam reflected from the target surface 70 and then the beam splitter 60, is outlined by the lines 71'-72'. Similarly, the beam from the aperture 8 (i.e., the light passing through the aperture 8 in mask 50) to the target surface 70 is outlined by the lines 81-82, and the beam reflected from the target surface 70 is outlined by lines 81'-82' in FIG. 1. The outlines of the light beams shown throughout FIG. 1 show the approximate extents of the operable (detected) rays from each of the apertures 7 and 8. In general, the wavefronts from the apertures 7, 8 spread over a larger range, such that even if the target surface 70 is tilted somewhat, there will still be rays reflected to the beamsplitter 60 and the detector 80, approximately as shown. The rays that fall outside of the detector 80 are generally irrelevant to the operation described herein, and are not shown.

Figure 2:
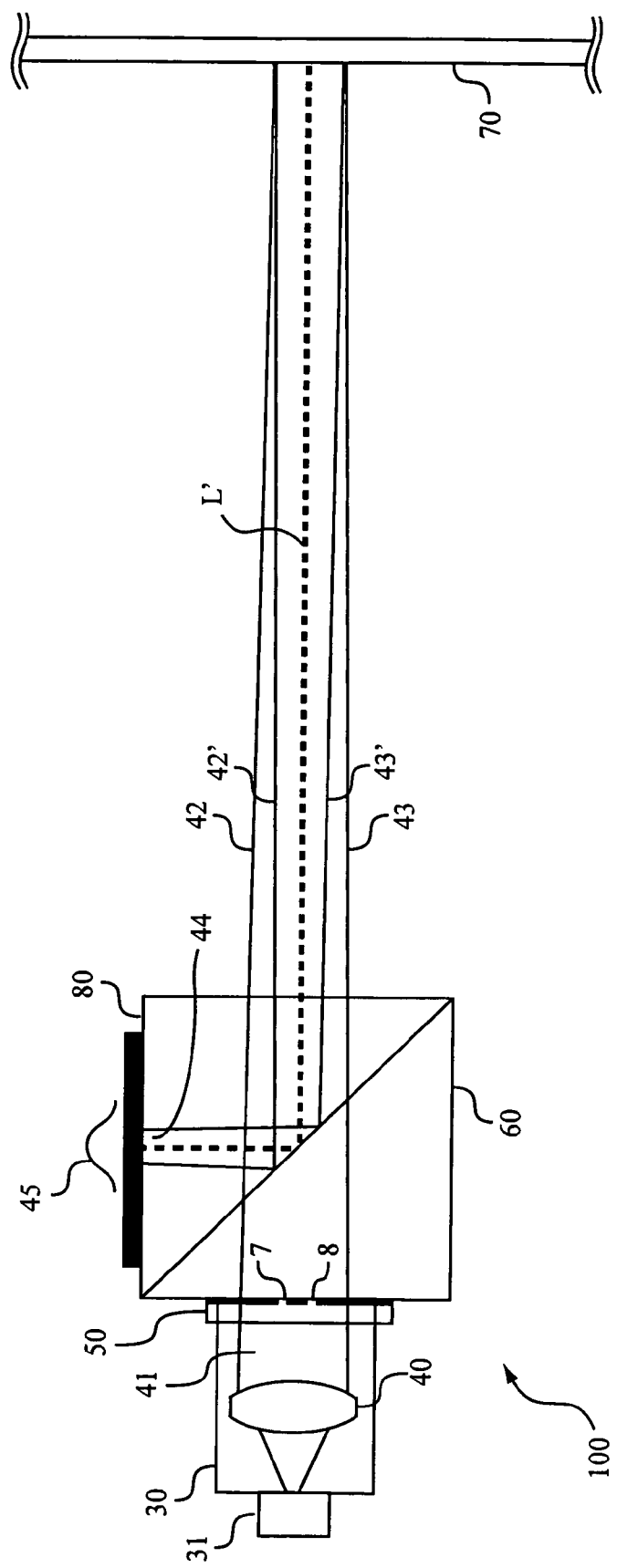
FIG. 2 is another diagram of the exemplary tilt sensor shown in FIG. 1, illustrating a path of the light transmitted from the light source that passes through a partially transmitting mask.

The rays from the apertures 7 and 8 may initially pass through the beam splitter 60, may reflect off the target surface 70, and may be deflected by the beam splitter 60 to reach the detector 80. Where the rays from the apertures 7 and 8 overlap between the lines 71 and 81, a field of interference fringes will be formed. For embodiments in which the apertures 7 and 8 may be pinhole apertures, the fringes may be oriented normal to a line that includes the two pinholes. For embodiments in which the apertures 7 and 8 may be slit apertures, the fringes may be oriented parallel to the slits. The region 75 between the dashed lines 71' and 81' in FIG. 1 illustrates an approximate area of the detector 80 that may be covered by interference fringes resulting from the light reflected off the target surface 70. At the detector 80, the fringe pitch (e.g., the center to center distance between the fringes) will depend on the wavelength of the light, the spacing between the apertures 7 and 8, and the total optical path length from the apertures to the detector 80, as described in greater detail below. The distance from the apertures to the target surface may be designated L, and the nominal optical path length from the target surface 70 to the detector 80 may be designated L', as shown in FIG. 2. In exemplary embodiments described below, L' may equal L. The various distance and tilt relationships described herein may be adapted by one of ordinary skill in the art to a case where L is not equal to L'.

The image received at the detector 80 may be subjected to image processing by a signal processing and control circuit (not shown) to determine the nominal fringe pitch. For example, in some embodiments, when the fringes are oriented vertically in an image, the vertical projection of the image may be determined. The vertical projection may sum the intensities of the pixels along each column of pixels in the image. One exemplary vertical projection is shown in the lower portion of FIG. 11, described further below. A Fourier transform may be performed on the vertical projection, and the interpolated peak value of the Fourier transform will identify the spatial frequency, and therefore the nominal fringe pitch of the fringes in the image. The fringe pitch may then be used to determine the total optical path length from the apertures 7 and 8 to the detector 80, and the distance or range L from the readhead to the target surface 70, as described in greater detail below.

In exemplary embodiments, the projection data input to the Fourier transform may be zero-padded according to known techniques, for example, to increase the accuracy of the fringe pitch determined from the Fourier transform. For example, in exemplary embodiments, zero-padding may be used to provide at least 1024, or 2048, or more, data points for the Fourier transform operations, for example, if the detector does not have enough pixels to provide a desired number of data points without zero-padding. In addition, the location of the resulting Fourier transform peak may be found with a resolution and/or accuracy that is finer than the Fourier transform data spacing by finding an "interpolated" peak. For example, an interpolated peak may be found by finding the centroid of the area under the peak or by fitting a curve to the Fourier transform data in the vicinity of the peak and finding the location of the peak of the fitted curve, or the like. Teachings related to zero-padding, as well as other techniques that are usable to enhance the accuracy of the location of a Fourier transform peak, are included in U.S. Pat. No. 5,035,281 to Jianhua Li, which is incorporated herein by reference in its entirety.

In various embodiments, the beam splitter 60 may comprise an unpolarized beam splitter. However, such an unpolarized beamsplitter may lose approximately 50% of the light at each transmission and reflection. In various embodiments, the beam splitter 60 may alternatively comprise, for example, a polarizing beam splitter with a quarter wave plate adjacent to the surface that is oriented toward the target surface, with its optical axis adjusted to reflect almost all the light received from the target surface 70 to the detector 80.

FIG. 2 is another diagram of the exemplary tilt sensor shown in FIG. 1, emphasizing a path of the light transmitted from the light source 30 that passes through the partially transmitting mask 50. More particularly, solid lines 42 and 43 extending from the mask 50 toward the target surface 70, and solid lines 42' and 43' extending back to the beam splitter 60 and further deflected toward the detector 80 illustrate the path of the light rays transmitted through the mask 50. The region 44 between the solid lines 42' and 43' adjacent to the detector 80 illustrates an approximate area of the detector 80 that may be covered by the light of the beam 41 that is reflected off the target surface 70. The location of the region 44 on the detector 80 will vary according to the tilt of the target surface 70 and the distance L'. As discussed above, in some embodiments, it may be convenient for L'=L, although this is not required.

FIG. 2 also schematically illustrates a Gaussian distribution 45 adjacent to the detector 80. The Gaussian distribution 45 represents a light intensity distribution across the detector 80. In exemplary embodiments, a centroid of the Gaussian distribution 45 may be used to represent the location of the region 44, and may be used to determine the tilt and/or pitch of the target surface 70 relative to the readhead 100. The centroid may be determined based on performing a "center of mass" type of calculation (using intensity instead of mass), based on the distribution observed at the detector 80. By determining a location of the centroid of the region 44 and applying distance or range information that is determined or known based on the fringe pitch, it may be possible to obtain absolute tilt information with a resolution of at least 0.001 degrees, for example.

In exemplary embodiments, the mask 50 may be a thin film mask on glass, such as a chrome mask, or the like. While the exemplary mask 50 is shown with two apertures 7, 8, the mask 50 may include any practical number of apertures, as described in greater detail below. In exemplary embodiments, the mask 50 may be optically thin, to allow, for example, some of the incident light to pass through. The amount of light of the beam 41 transmitted through the thin film to achieve the partial transmission, as discussed above with reference to FIG. 2, may be controlled by the thickness of the deposition of the thin film. Thus, in various embodiments, a mask with a thickness that allows some of the incident light to pass through non-aperture regions may be employed. In various embodiments, the thin film mask may provide an optical density (OD) of about approximately 3 to 5 such that about 0.001% to 0.1% of the incident light passes through the mask and onto the target surface 70. More generally, in exemplary embodiments, the optical density may be chosen such that the peak fringe intensity roughly matches the peak intensity of beam spot, for example, within a factor of approximately 10.

In various embodiments, the readhead components and sensing configuration may be chosen such that a minimum fringe pitch may be about 4× to about 10× larger than a pixel pitch of the detector 80. A larger minimum fringe pitch relative to the pixel pitch may be used in various embodiments. However, the accuracy with which the fringe pitch and the associated distance or measurement may be determined may be reduced. A maximum fringe pitch may be less than a field of view of the detector 80.

With regard to the aperture size, selection of the aperture size generally involves a design trade-off. A relatively larger aperture may transmit more light and relatively improve the visibility or signal-to-noise ratio of the fringes, but may also provide a relatively smaller area on the detector were fringes are visible. A relatively smaller aperture may transmit relatively less light, but may also provide a wider diffraction angle, which may increase the area on the detector where fringes are visible. In exemplary embodiments, the aperture size may be selected such that fringes are visible over about ⅔ or more of the field of view of the detector 80.

All, or substantially all, fringe pitch measurements may occur outside the region 44 where the partially transmitted beam provides a significant intensity on the detector 80. Thus, it may be desirable to provide an aperture size such that the region 75 where fringes are clearly visible on the detector 80 is at least several times larger than the fringe pitch and larger than the region 44. In exemplary embodiments, the apertures may include pinholes having a diameter in a range of about 5 µm to about 20 µm, or slits having a width in a range of about 5 µm to about 20 µm. In exemplary embodiments, the pinhole size or slit width may be about 8 μm, with the pinholes or slits separated by about 300 μm, and with the optical path length between the apertures and the detector 80 being about 40 mm.

Figure 8:
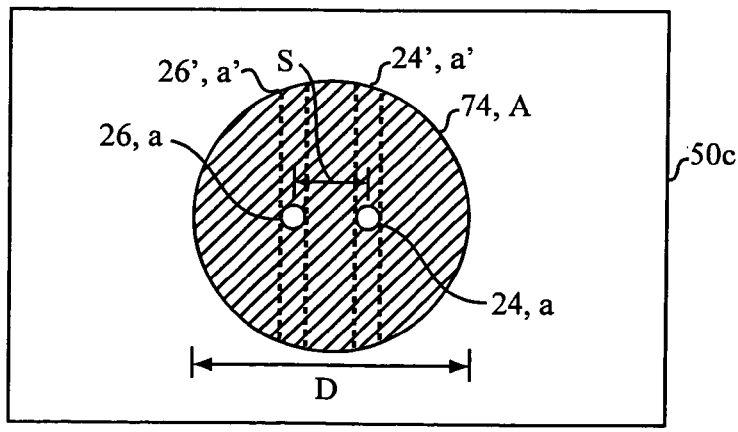
FIG. 8 is a diagram of a beam spot in relation to exemplary apertures of an exemplary mask.

In addition to the variables discussed above that may affect measurements obtained using the tilt sensor 100, to improve and/or to simplify sensing, a size of a partially transmitted beam spot may also be adjusted. That is, the size and focal length of the beam that is partially transmitted through the mask 50 may be adjusted. FIG. 8 is a diagram of a beam 74 at the plane of an exemplary mask 50c, in relation to pinholes 24, 26 (or slits 24', 26') on the exemplary mask 50c. The beam 74 may have a diameter D. The pinholes 24, 26 (or slits 24', 26') may be separated by a distance s. For a mask configuration that uses pinhole apertures, each pinhole 24, 26 may correspond to an area of size a on the mask 50c. For a mask configuration that uses slit apertures, the area of each slit 24', 26' that is illuminated by the beam 74, which may be limited either by the length dimension of the slit (not shown) or the limits of the beam 74, or both, may correspond to an area of size a' on the mask 50c. The diameter D of the beam 74 may generally be larger than the distance s between the pinholes 24, 26 (or slits 24', 26') such that, depending on the intensity distribution within the beam 74, light of a sufficient intensity to produce desirable fringes falls on the pinholes 24, 26 (or slits 24', 26'). In addition, the focal length of the light in the beam 74 may be selected to produce a desired spot size (e.g., the size of the region 44 shown in FIG. 2) on the detector.

In exemplary embodiments, a beam area A, corresponding to a cross-sectional area of the beam 74 at the mask, as well as the focal length of the light included in the beam 74, may be adjusted based on experiment or analysis. In embodiments, the beam area A and the focal length may be adjusted so that the intensity distribution of the corresponding partially-transmitted beam image observed at the detector 80, is similar to the intensity of the fringe pattern observed at the detector 80. In embodiments, it may be preferred for the peak intensity of the partially-transmitted beam in an image on the detector 80 to approach the maximum gray level output of the detector 80, without saturating. This may generally enhance the accuracy of the tilt measurements resulting from analysis of the image provided by the detector 80. In exemplary embodiments, a transmittance T of coherent light from the light source 30 through the mask 50c, and a transmittance t of coherent light from the light source 30 through the pinholes 24, 26, or the slits 24', 26', respectively, may approximately satisfy the relationship AT~at, or AT~a't, respectively.

Figure 3:
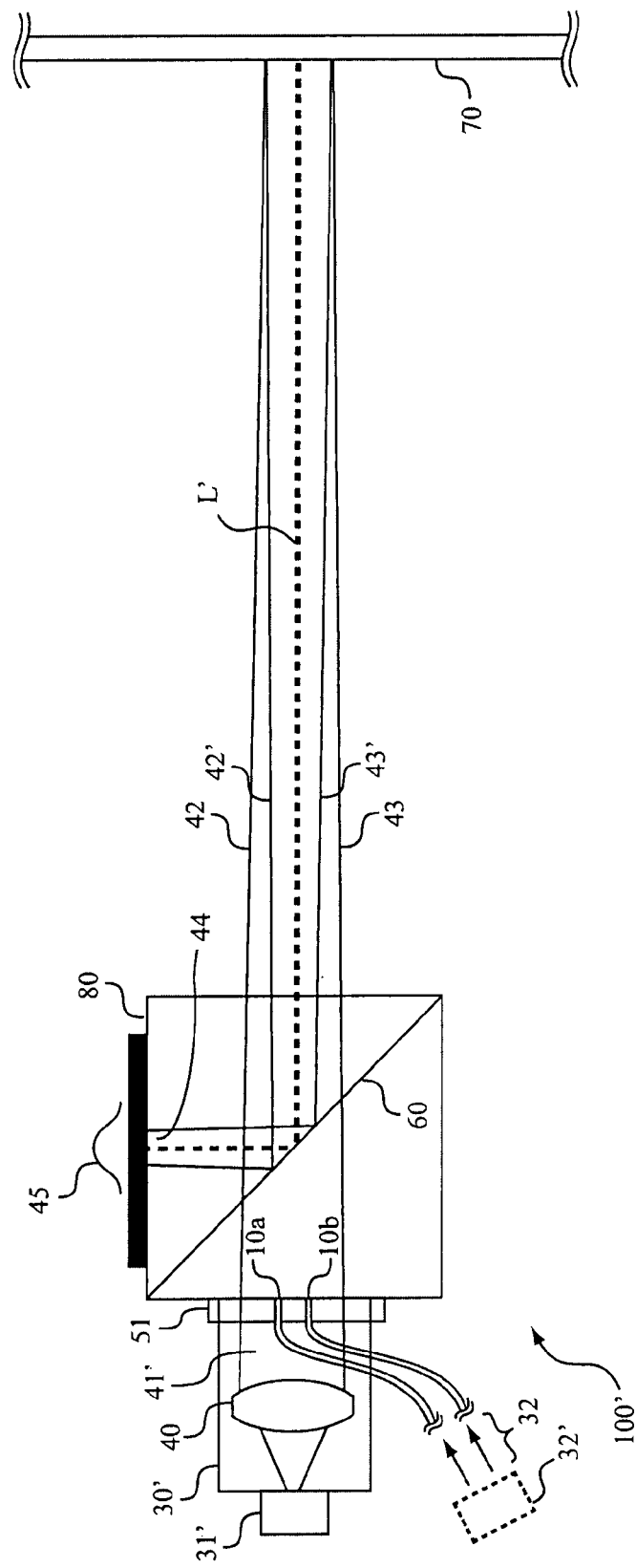
FIG. 3 is a diagram of an exemplary tilt sensor configuration wherein light from a light source is transmitted from the ends of two optical fibers.

FIG. 3 is a diagram of another exemplary tilt sensor configuration 100' comprising two coherent point sources 10a, 10b provided by the ends of corresponding optical fibers that transmit coherent light 32 from a suitable light source. The tilt sensor configuration 100' is generally similar to the previously described tilt sensor configuration 100, and only the notable differences are included in the following description. Similar to the previous discussion of aperture sizes, it may be desirable to select the optical fibers and/or the configuration of their ends by analysis and/or experiment such that the region where fringes are clearly visible on the detector 80 is at least several times the fringe pitch larger than the region 44. A single optical fiber (not shown) may be coupled to a coherent light source and to an optical fiber splitter (not shown). The optical fiber splitter may be used to couple coherent light 32 to the two optical fibers that terminate at the point sources 10a, 10b. In exemplary embodiments, such optical fibers may have a mode field diameter and/or core size of about 4-10 μm. In exemplary embodiments, the optical fibers may have a mode field diameter of about 4 μm and coherent light having a wavelength of approximately 635 nm may be used, and a desirable width of diffraction may be provided for the light emitted from the optical fiber point sources 10a, 10b. The coherent light source may be the light source 31', or it may be a separate light source 32', in some embodiments. In such embodiments, in which a mask is not used to provide the point sources 10a and 10b, the beam 41' may be a fully or substantially fully transmitted beam. However, the beam 41' may otherwise be similar to the partially transmitted beam 41. When a separate coherent light source 32'is used, the light source 31' that provides the transmitted beam 41' may be an incoherent light source, if desired. In the embodiment shown in FIG. 3, the optical fibers are located using a transparent block 51. This embodiment may have a disadvantage that the optical fibers distort the beam 41'. This disadvantage may be overcome in an exemplary embodiment (not shown) in which the transparent block 51 is replaced by a beamsplitter. The beam 41' may pass through the beamsplitter. The optical fibers may be located out of the beam 41' and oriented to emit coherent light toward the beamsplitter such that the beamsplitter deflects the coherent light toward the target surface 70, as desired.

Figure 4:
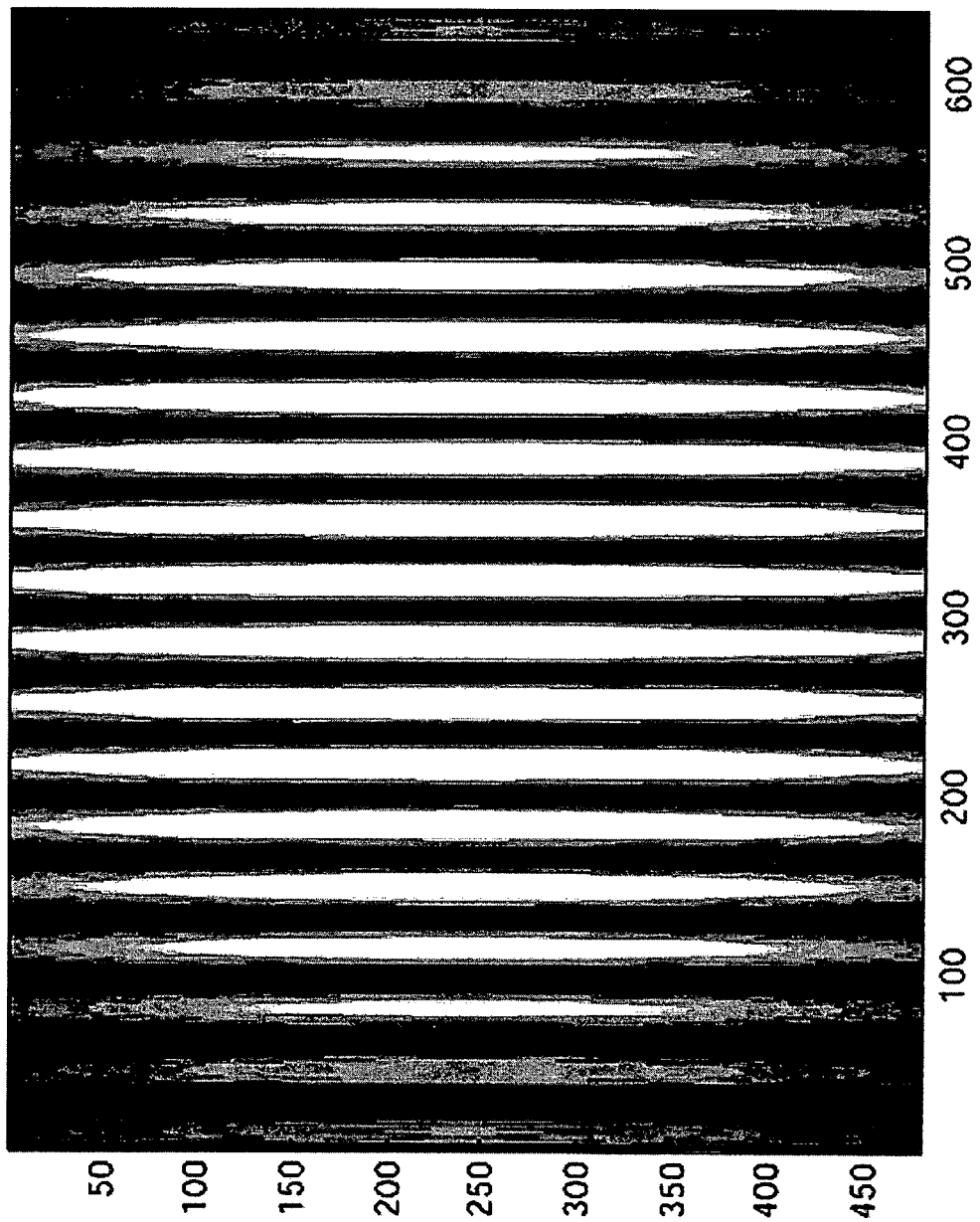
FIG. 4 is an exemplary simulated image of a fringe pattern produced on a detector by the aperture arrangement shown in FIG. 1 or the optical fiber arrangement shown in FIG. 3.
Figure 5:
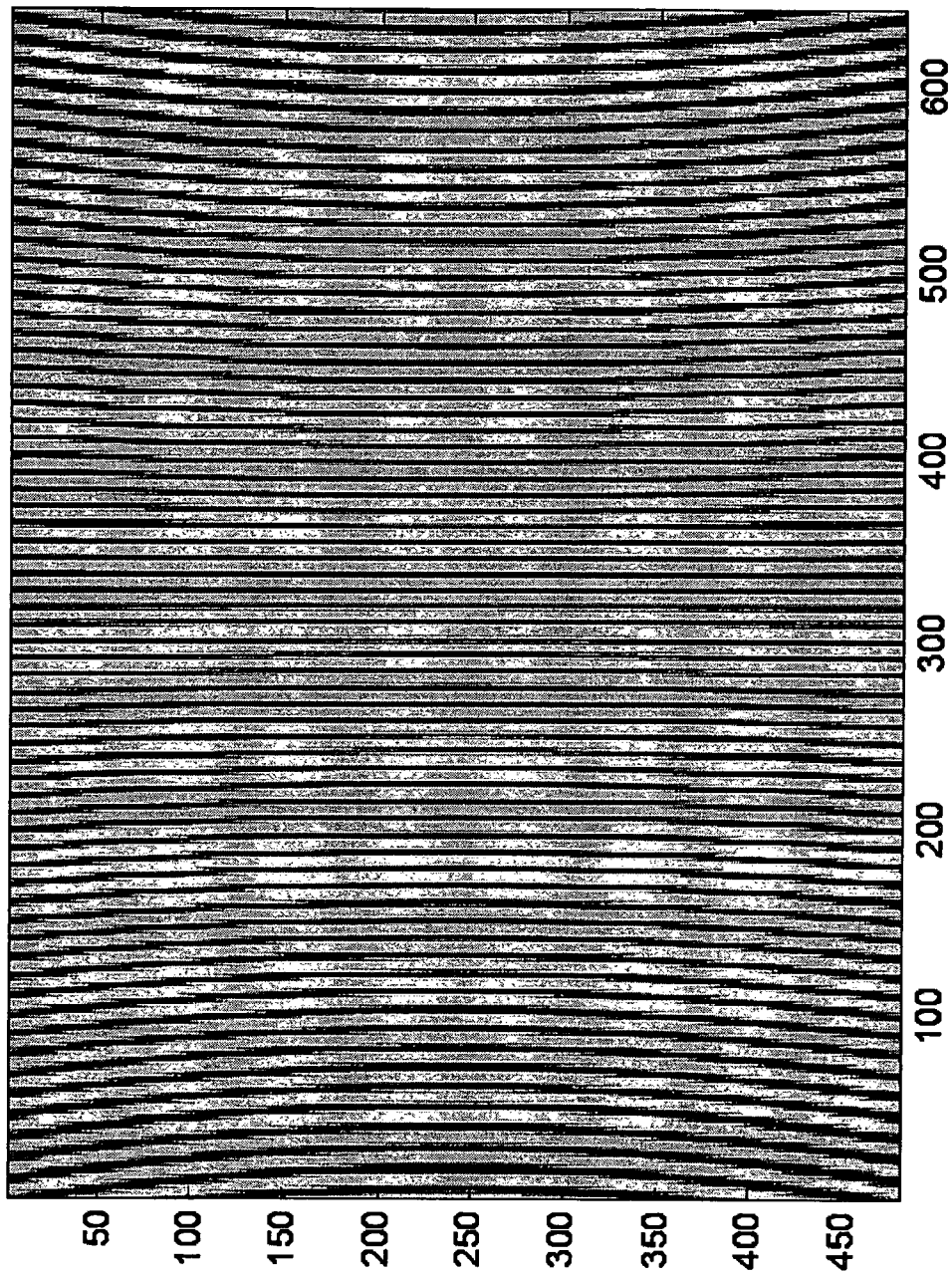
FIG. 5 is a second exemplary simulated image of a fringe pattern produced on a detector by the aperture arrangement shown in FIG. 1 or the optical fiber arrangement shown in FIG. 3.

FIGS. 4 and 5 are exemplary simulated images of fringe patterns produced on a detector by interference between light from two coherent point sources. Such point sources may be provided by pinhole apertures, which may be used for the apertures 7, 8 in exemplary embodiments of the arrangement shown in FIG. 1 or the optical fiber arrangement that provides the two coherent point light sources 10a, 10b shown in FIG. 3. More generally, any other means suitable for approximating point sources, either known or hereafter developed, may be used in various exemplary embodiments.

The axes of the simulated images shown in FIGS. 4 and 5 are in units of pixels, where the pixel pitch may be, for example, 7.4 μm. The simulated image shown in FIG. 4 corresponds to an arrangement in which the two coherent point sources are separated by a distance s of 100 μm and the optical path length between the two coherent light sources and the detector is 40 mm.

The simulated image shown in FIG. 5 corresponds to an arrangement in which the two coherent point sources are separated by a distance s of 50 μm and optical path length between the two coherent light sources and the detector is 5 mm. As shown in FIG. 5, away from the optical axis in the X and Y directions, the fringe pattern is slightly distorted. The effects of distortion may be a minor when measuring the fringe pitch using the previously described Fourier transform technique, or the like, and may be ignored in exemplary embodiments. In other embodiments, for the highest accuracy, the distortion may be corrected by a compensation that is determined by calculation or by an experimentally determined look up table, or the like.

When line sources (slit apertures) are used rather than point sources (pinhole apertures), the resulting fringe patterns may be very similar to those shown in the images in FIGS. 4 and 5. However, due to their extended length, line sources may provide more uniform fringe intensity, as least along the length of the fringes, and distortion of the fringes may be somewhat reduced near corners of the image. Otherwise, fringe patterns resulting from line sources may be approximately the same as those from point sources having comparable dimensions and spacing.

In exemplary embodiments, as the optical path length between the detector and the two coherent sources is increased, the phase difference between the light from the two sources may vary more slowly across the detector and the fringe pattern may have a larger pitch. The fringe pitch may vary depending on the optical path length between the detector and the two coherent light sources, according to the relationship defined in Equation (1).

$$d \approx \lambda(L+L')/s \qquad \text{Equation (1)}$$

where d=fringe pitch, λ=wavelength of light source, L=nominal optical path length between the sources and the target surface, L'=nominal optical path length between the target surface and the detector, and s=distance (the center-to-center distance) between the sources. Equation (1) provides an approximate nominal value for the fringe pitch d for portions of the image on a detector where the optical path length (L+L') is approximately the same. The nominal optical path length (L+L') may be determined based on the nominal fringe pitch d. The nominal distance or range from a reference plane of the readhead to the target surface may then be determined based on the nominal optical path length (L+L') and known design parameters of the readhead. Equation (1) may be derived from Equation (2) and Equation (3).

$$\theta \sim 0.5 s/(L+L') \qquad \text{Equation (2)}$$

$$d*2\theta \sim \lambda \qquad \text{Equation (3)}$$

In exemplary embodiments, more than two apertures may be used to simultaneously provide at least two different pitches of interference light on the detector, for example, to increase a working range of the system. For example, three pinholes (e.g., a pinhole on the origin, one at $s_x$ units away on along an X axis direction, and one at $s_y$ units away along a Y axis direction that is orthogonal to the X axis) may provide a two-dimensional matrix of interference features. Ideally, the spacing of the interference features along either of the two dimensions of the two-dimensional matrix of features may be used to obtain the optical path length (L+L'). However, due to practical limitations, it may be advantageous to use the spacing along a particular dimension, or both dimensions, in certain situations, as outlined below.

Figure 6:
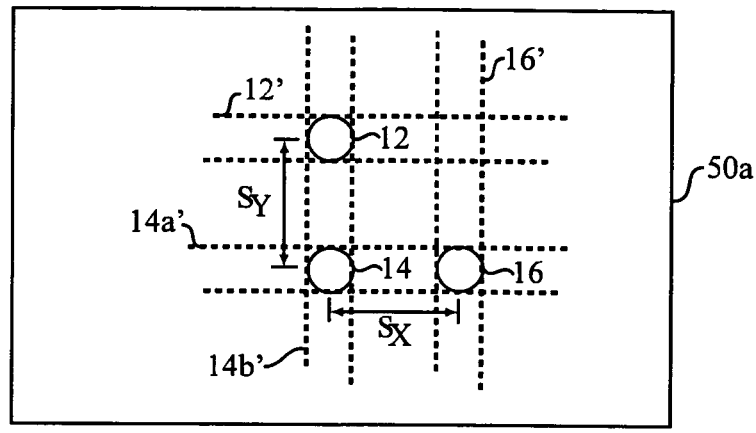
FIG. 6 illustrates first and second exemplary mask configurations that produce a "crossed" fringe pattern at the detector.
Figure 7:
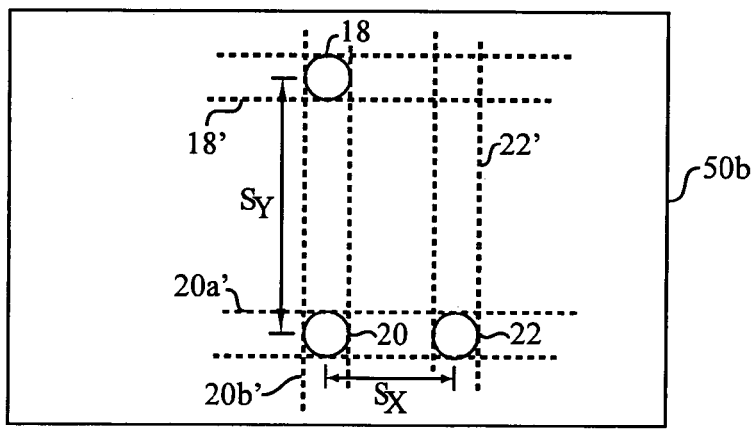
FIG. 7 illustrates third and fourth exemplary mask configurations that produce another "crossed" fringe pattern at the detector.

FIG. 6 illustrates first and second exemplary thin film mask aperture configurations that produce a "crossed" fringe pattern at the detector. FIG. 7 illustrates third and fourth exemplary thin film mask aperture configurations that produce another "crossed" fringe pattern at the detector. The first mask aperture configuration shown in FIG. 6 may include three pinholes 12, 14, 16. The second, alternative, mask aperture configuration shown in FIG. 6 may include four slits 12', 14a', 14b', and 16'. The three pinholes 12, 14, 16 of the first aperture configuration of the exemplary thin film mask 50a illustrated in FIG. 6 may be spaced apart equally in both the X and Y directions. For example, a first pinhole 12 may be spaced a distance $s_y$ from a second pinhole 14, and a third pinhole 16 may be spaced a distance $s_x$ from the second pinhole 14, with $s_x=s_y=50$ μm. The four slits 12', 14a', 14b', and 16' of the second aperture configuration of the exemplary thin film mask 50a illustrated in FIG. 6 may be spaced apart equally in both the X and Y directions. For example, a first slit 12' may be spaced a distance $s_y$ from a second slit 14a', and a third slit 16' may be spaced a distance $s_x$ from a fourth slit 14b', with $s_x=s_y=50$ μm. The third aperture configuration of the exemplary thin film mask 50b illustrated in FIG. 7 may include three pinholes 18, 20, 22. The first pinhole 18 may be spaced a distance $s_y$ from a second pinhole 20, and a third pinhole 22 may be spaced a distance $s_x$ from the second pinhole 20, with $s_x=50$ μm, and $s_y=2s_x=100$ μm. The fourth aperture configuration of the exemplary thin film mask 50b illustrated in FIG. 7 may include four slits 18', 20a', 20b', and 22'. The first slit 18' may be spaced a distance $s_y$ from a second slit 20a', and a third slit 22' may be spaced a distance $s_x$ from a fourth slit 20b', with $s_x=50$ μm, and $s_y=2s_x=100$ μm.

In general, aperture sizes and/or optical fiber core sizes or end configurations may be selected by analysis and/or experiment such that the apertures or fibers sufficiently diffract incident light to fill the detector 80. Separation distances s between apertures or fibers may be selected based on a desired fringe pitch at a nominal gap. For example, the apertures may have a pinhole diameter or slit width of 10 μm and a center-to-center distance s between the apertures may be equal to 100 μm.

Figure 9:
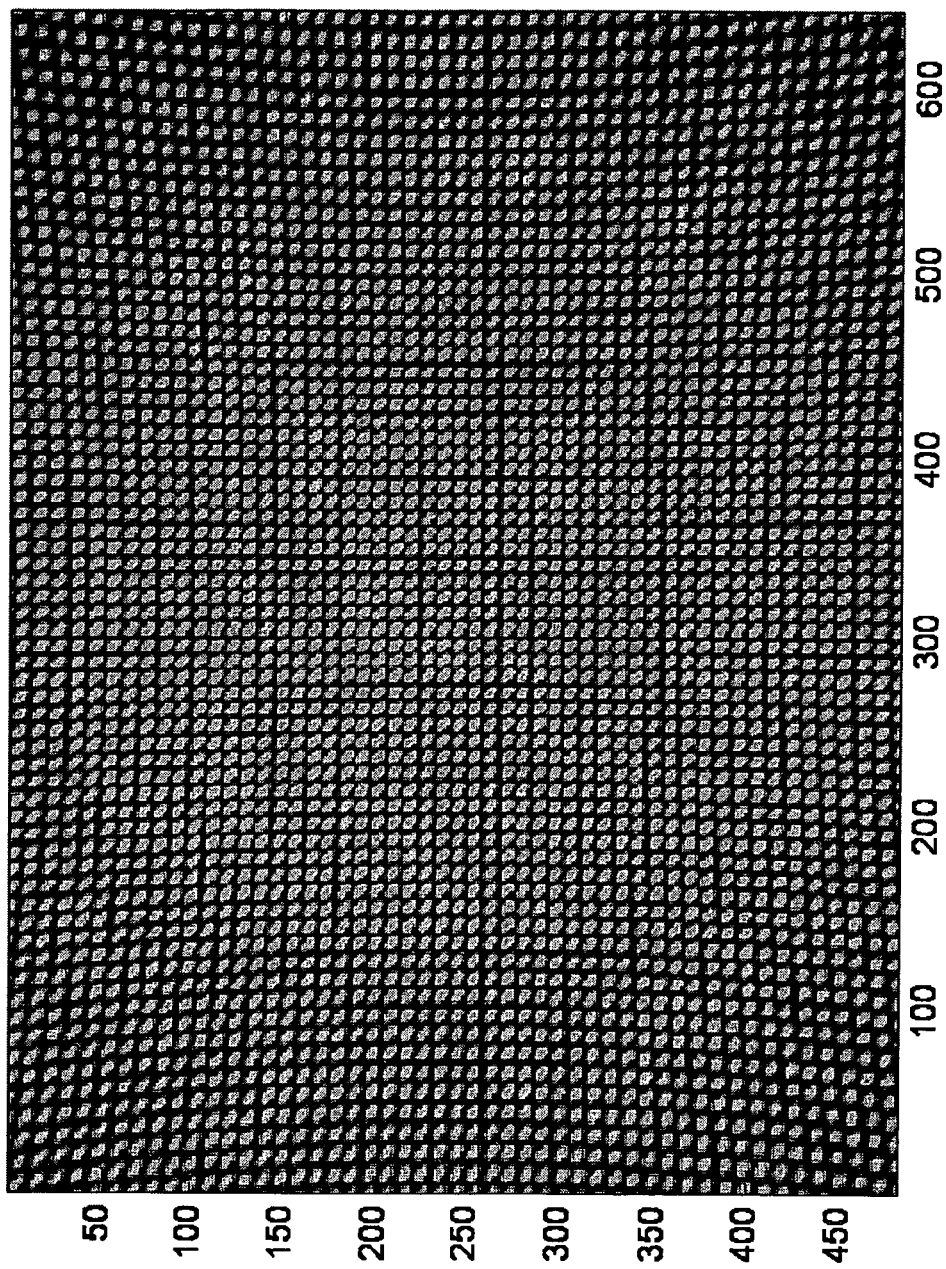
FIG. 9 is an exemplary simulated image produced from a system including the mask shown in FIG. 6.
Figure 10:
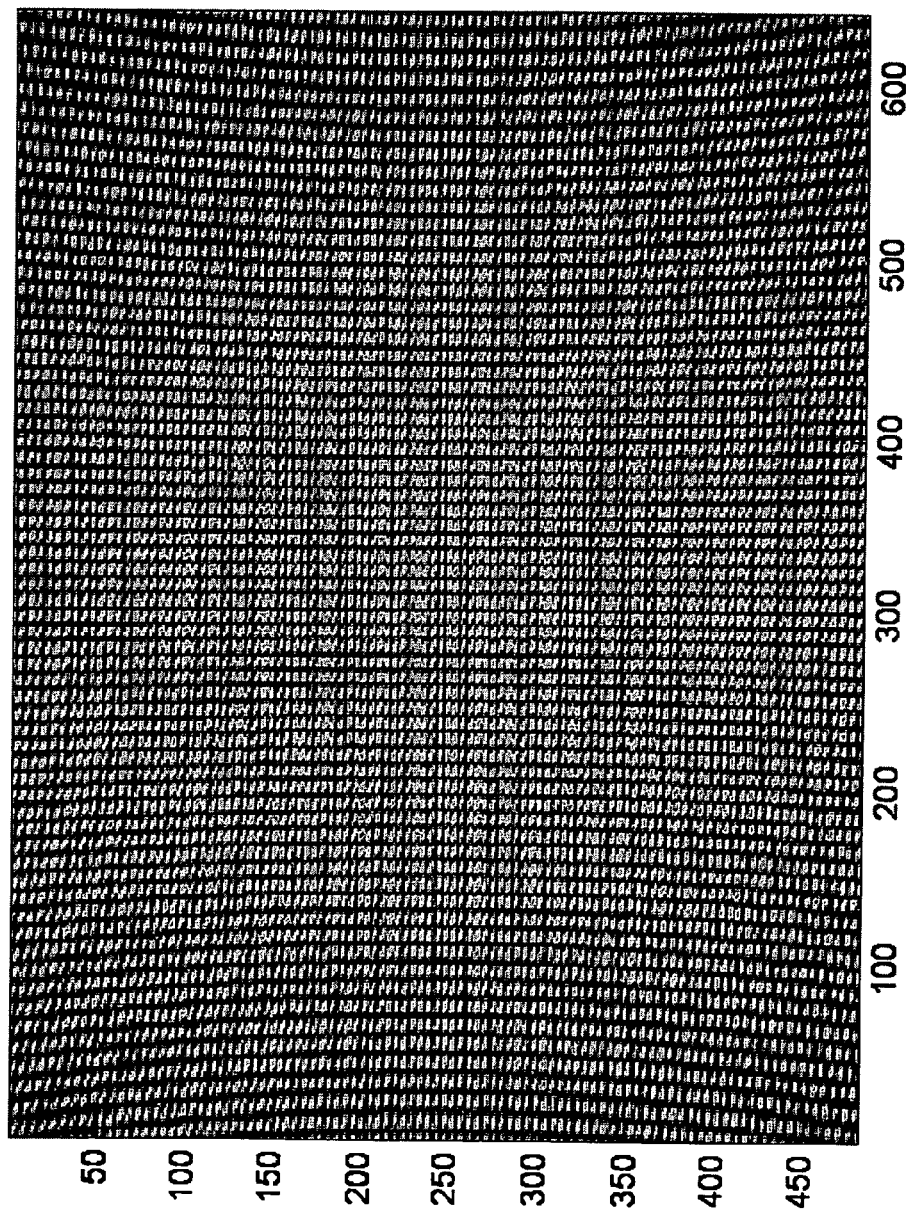
FIG. 10 is an exemplary simulated image produced from a system including the mask shown in FIG. 7.

FIGS. 9 and 10 are exemplary simulated images produced from a system including a thin film mask with three pinholes. The axes of the simulated images shown in FIGS. 8 and 9 are in units of pixels. The simulated image illustrated in FIG. 9 may be obtained using a thin film mask 50a, shown in FIG. 6, where (L+L') is 5 mm. Since $s_x=s_y$ for the mask 50a, the pitch of the matrix of interference features is nominally the same along each axis or dimension of the matrix. The simulated image illustrated in FIG. 10 may be obtained using a thin film mask 50b, shown in FIG. 7, where (L+L') is 5 mm. Since $2s_x=s_y$ for the mask 50b, the pitch of the matrix of interference features along a first axis of the matrix is determined by $s_x$ and will have first dimension. The pitch of the matrix of interference features along a second axis of the matrix is determined by $s_y=2s_x$, and according to EQ. 1 will therefore have a dimension that is half of the first dimension.

For optical path lengths for which the "fringe" pitch along the first direction becomes too large to provide good accuracy (e.g., by providing too few fringes along the corresponding axis in the image on the detector, such that the fringe pitch along that axis cannot be determined with good accuracy), it may be advantageous to determine the optical path length based on the fringe pitch along the second direction, where the fringe pitch is approximately half of that along the first direction and may therefore be determined based on a greater number of fringes. Conversely, for optical path lengths such that the "fringe" pitch along the second direction becomes too small to provide good accuracy (e.g., by providing too few pixels for each fringe pitch along the corresponding axis in the image on the detector, such that the fringe pitch cannot be determined with good resolution), it may be advantageous to determine the optical path length based on the fringe pitch along the first direction, where the fringe pitch is approximately twice that along the second direction and may therefore be determined with a resolution based on a greater number of pixels per fringe. Accordingly, a readhead that includes respective pairs of sources that have different respective spacings between them, as exemplified by the mask 50b, may provide a larger overall measurement range than a readhead with a single pair of sources, or with respective pairs of sources that have the same respective spacing between them.

In addition to the variables already discussed above, the overall size and pixel pitch of the detector 80 may be selected to simplify and/or enhance fringe pitch and/or tilt determination, and the allowable operating range of the tilt sensor.

Figure 11:
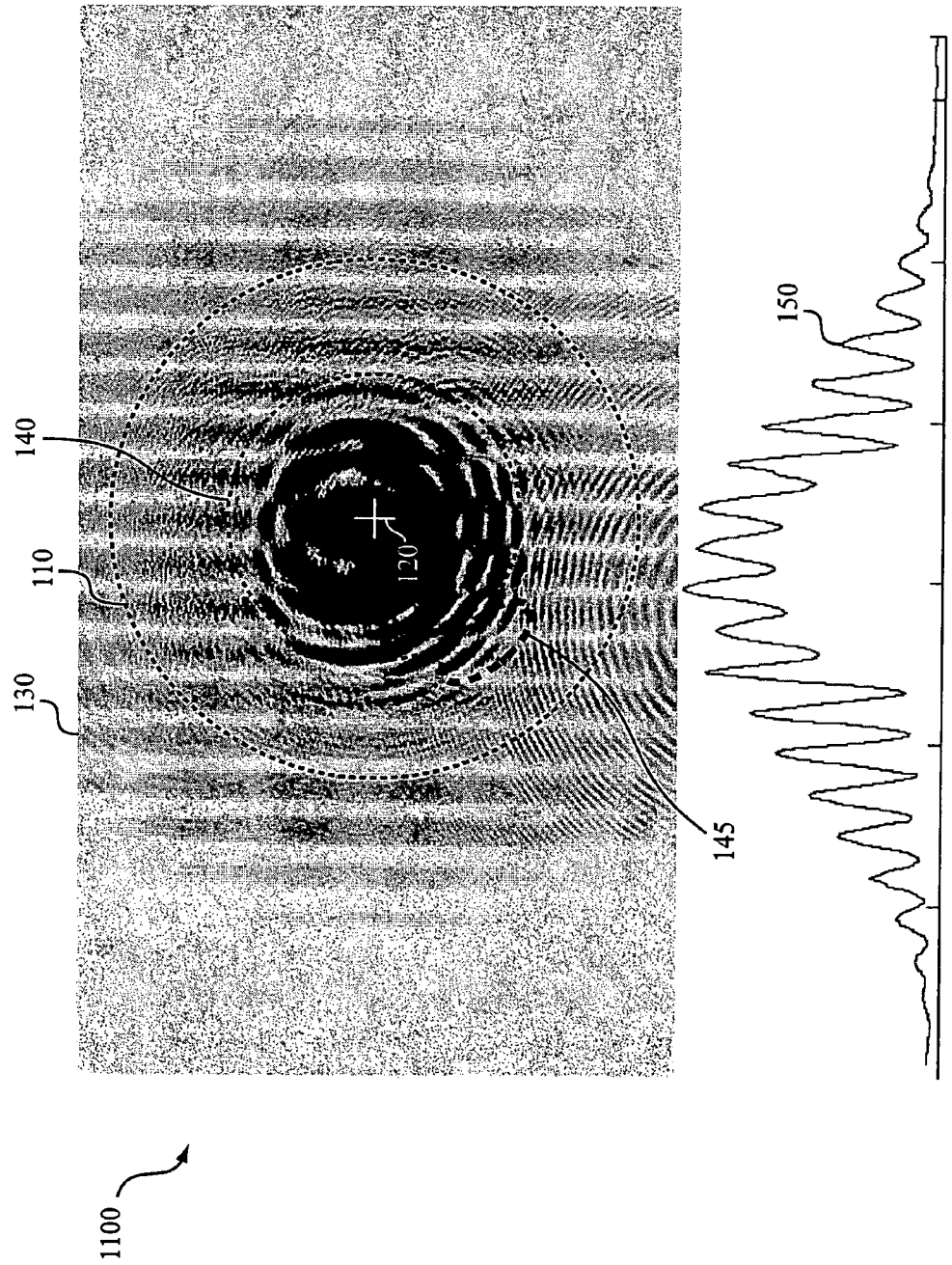
FIG. 11 is an exemplary image, as seen from an exemplary detector of the tilt sensor shown in FIG. 1.

FIG. 11 shows an exemplary image 1100, as may be provided by the detector 80 of the tilt sensor 100 shown in FIG. 1, or 100' shown in FIG. 3. The image is shown as a "negative" because it reproduces more clearly as a negative. That is, the dark region within an inner dotted circle identifies a highly exposed portion 140 in the center of the image. That highly exposed portion 140 is a bright region on the detector 80, etc. The highly exposed portion 140 corresponds to the location of the partially transmitted beam region 44, shown in FIG. 2. FIG. 11 corresponds to a case where the target surface 70 has a minimal amount of tilt.

In exemplary embodiments, to help simplify image processing of the image detected by the detector 80, the fringes 130 may be aligned with rows and/or columns of a pixel array of the detector 80. In the example shown in FIG. 11, the fringes are aligned parallel to the pixel columns. Also shown in FIG. 11 is a vertical projection 150. The vertical projection 150 is a function where the amplitude is proportional to a summation of the pixel intensities along each respective column of pixels shown in the image 1100. As discussed above, in various embodiments, a Fourier transform may be used to process the vertical projection 150 and to determine the nominal fringe pitch. The nominal fringe pitch d may be determined based on the peak spatial frequency of the Fourier-transformed vertical projection (not shown).

Under various conditions the fringe pitch may not be uniform throughout an image. For example, the fringe pitch may be "distorted" by predictable geometric effects away from the center of the image, and/or by geometric effects due to tilt of the target surface, which will cause the optical path length to be somewhat different for the various points in the image. Accordingly, in a Fourier transform a spatial frequency peak that corresponds to the nominal fringe pitch d may appear as a relatively broad or "smeared" peak corresponding to the various pitch distortions in the image. Thus, in exemplary embodiments, the nominal peak spatial frequency corresponding to the nominal fringe pitch d may be determined by determining the location of the coordinate of the centroid of the area corresponding to the broad or "smeared" peak, along the spatial frequency axis of the Fourier transform.

Figure 12:
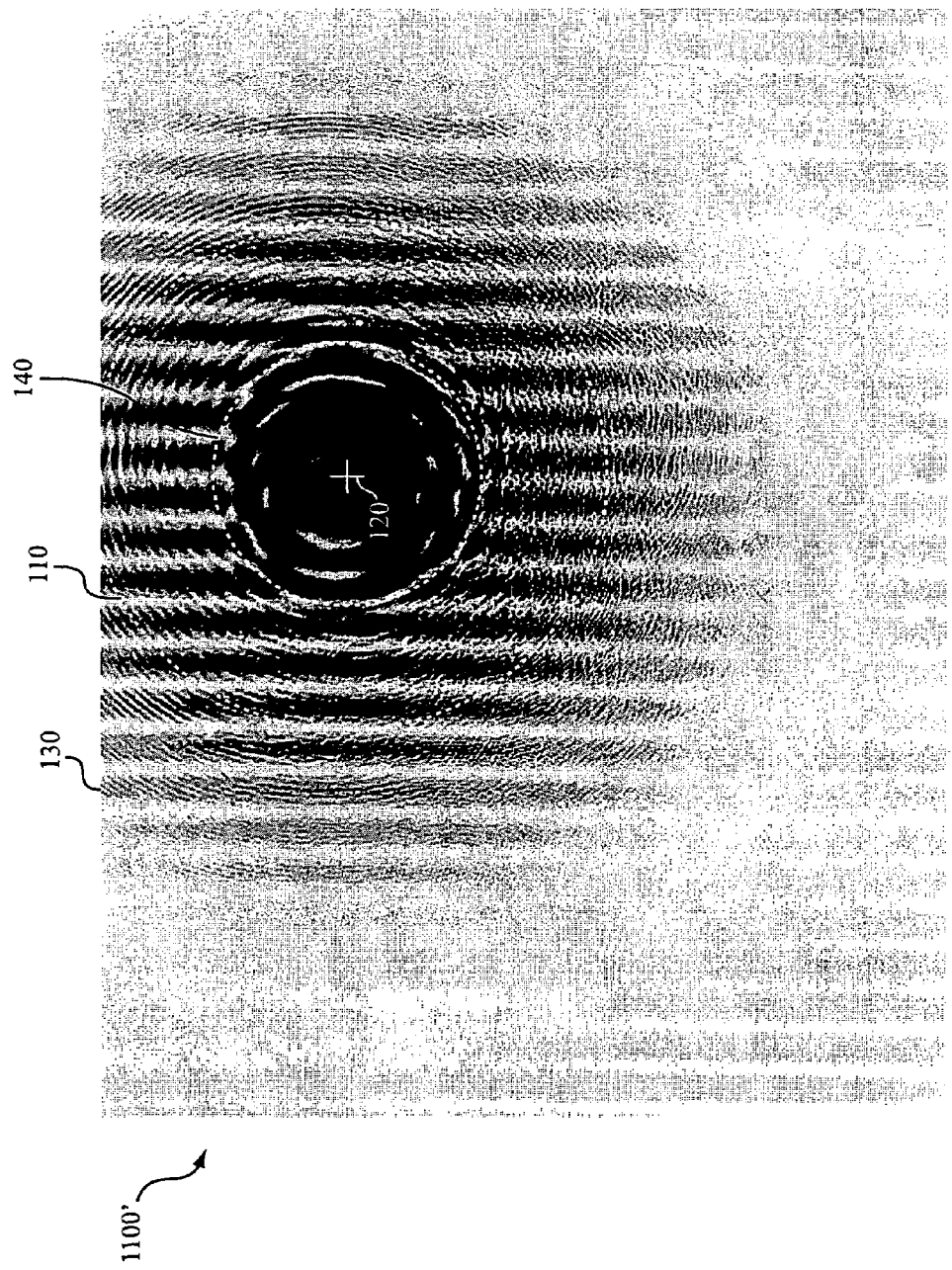
FIG. 12 is an exemplary image, as seen from an exemplary detector of the tilt sensor shown in FIG. 1, corresponding to a tilted target surface plane.

FIG. 12 shows an image 1100' similar to that shown in FIG. 11, except it corresponds to a relatively tilted target surface plane. Therefore, the highly exposed portion 140 corresponding to the location of the partially transmitted beam region 44 shown in FIG. 2 is located away from the center of the detector 80 and the image 1100', due to the deflection of the partially transmitted beam when it is reflected from the tilted target surface. The highly exposed portion 140 may correspond to a region corresponding to the peak Gaussian distribution 45 shown schematically in FIGS. 2 and 3. However, the "tails" of the Gaussian distribution 45 may extend approximately to an outer dotted circle that includes all or substantially all of the significant portions of the beam spot 110. The beam spot 110 corresponds to the beam of light that is partially transmitted through the mask 50, including the highly exposed portion 140. The nominal location of the beam spot 110, relative to its location when the target surface is not tilted, can be used along with known design parameters of the tilt sensor and a nominal optical path length that is determined based on a nominal fringe pitch, to determine the amount of tilt of the target surface with high accuracy. For example, in a configuration where L=L', d≈λ*2L/s, or L≈(d*s)/(2λ), then $\theta_{tilt}$≈R/L, where $\theta_{tilt}$ is in radians and R is the distance that the beam spot 110 is deflected across the detector 80 relative to its location when the target surface is not tilted.

In operation, the nominal location of the beam spot 110 may be estimated as the intensity-weighted centroid of the beam spot 110. For example, in embodiments, a signal processing and control circuit may receive image data from the detector 80 and determine the location of pixels having an intensity that exceeds a relatively high threshold value. Some of the pixels may be saturated, although this is generally not preferred for applications in which relatively higher tilt accuracy is desirable. The pixels that exceed the threshold value may be relatively few in number and may be further qualified or screened by one or more image processing operations, for example, a connected component analysis and/or a normalized average gray level check, to confirm that the pixels exhibit additional characteristics associated with a typical beam spot 110. Pixels that fail such additional screening may be disqualified. The intensity weighted centroid of a resulting set of pixels may be taken as the center of a circle having a predetermined radius corresponding to a typical radius of the beam spot 110, including a substantial portion of the previously described Gaussian distribution 45. Such a circle may generally include, but is not limited to, the highly exposed portion 140. The predetermined radius may also be the lesser of a predetermined radius and a minimum radius from the center of the circle to the edge of the image, in various embodiments.

The intensity weighted centroid of all pixels included within the predetermined radius may be taken as the location of the beam of partially transmitted light. The presence of fringes and/or various "optical noise" features within the predetermined radius will generally not affect the accuracy of the location determination, provided that there are several fringes within the predetermined radius, such that their effects on the centroid determination average out and contribute little or no error. The predetermined radius may be predetermined such that this condition is adequately fulfilled over the expected operating range of the tilt sensor. A crosshair identifies a centroid 120 of the beam of partially transmitted light in each of the detected images shown in FIGS. 11 and 12.

The images shown in FIGS. 11 and 12 include a substantial amount of optical noise. For example, extraneous interference features are superimposed on the desired vertical fringes in the region 145 shown in FIG. 11, and other extraneous fringes and diffraction effects and the like are generally visible throughout the image. In some embodiments, this optical noise may be ignored because its effects may be largely averaged away by various image processing methods, such as those outlined above. However, in other embodiments, in which the optical noise is in the form of spurious fringes, by varying or "chirping" the wavelength of the coherent light during the image exposure period of the detector 80, optical noise may be reduced or removed from the detected image because the spurious fringes may change phase relatively rapidly as a function of the wavelength, and may "wash out" or average out over the exposure period of the detector 80. In exemplary embodiments, the wavelength may be varied or chirped over a range of approximately 1 nm during the image exposure period of the detector 80, for example. In exemplary embodiments, the wavelength may be varied or chirped by rapid modulation of the drive current of a laser diode that provides the coherent light, for example.

The exemplary images described above are based on a flat, reflective target surface 70. The nominal distance or range to the target surface 70, as well as the nominal tilt, which may be decomposed into two orthogonal pitch and roll rotational components, may be determined by using such a target surface in conjunction with the tilt sensors 100, or 100', or the like. However, if scale features are provided as part of the target surface 70, making the target surface 70 a scale, additional components of the position or displacement of the target surface 70, relative to the readhead of the tilt sensor, may be determined, as discussed below.

Figure 13:
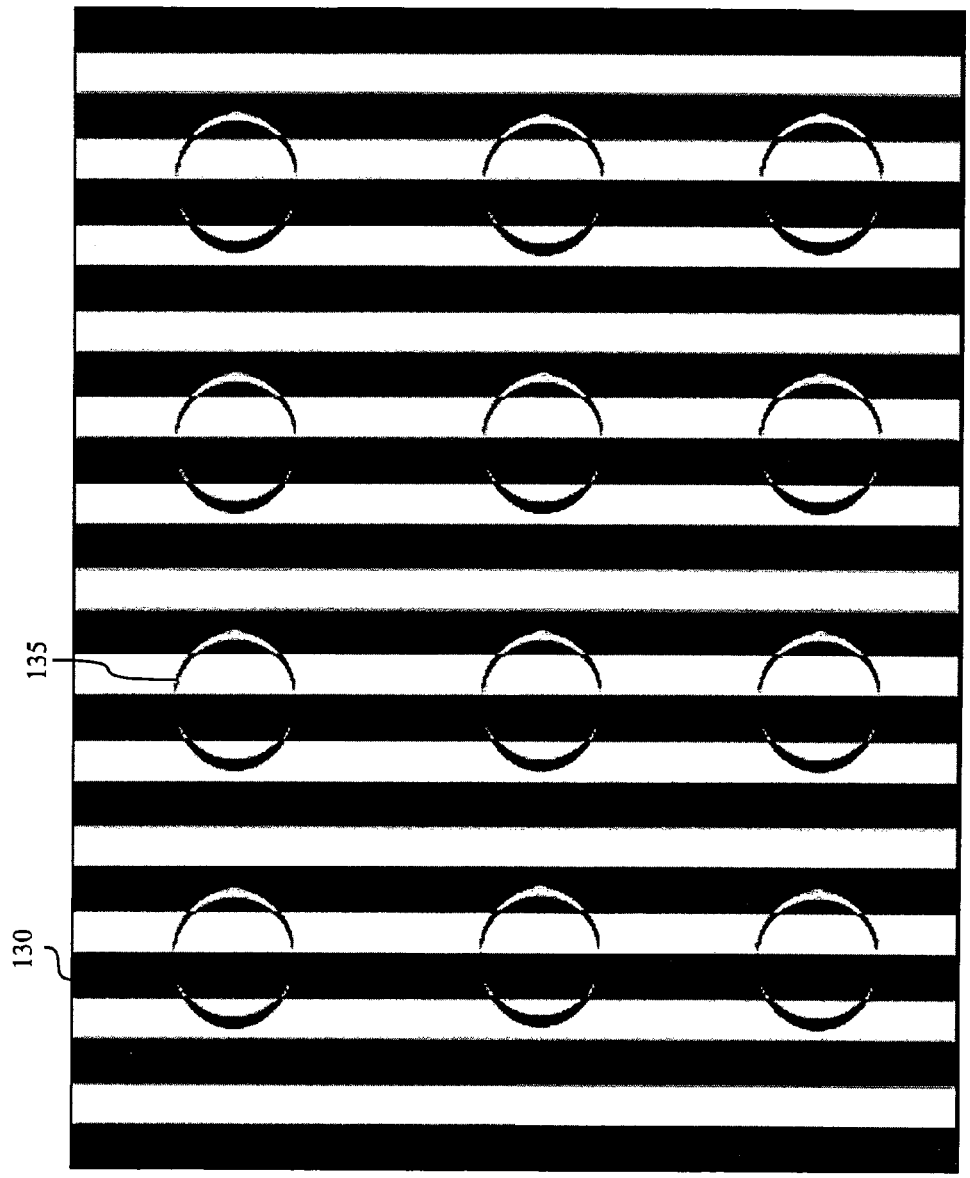
FIG. 13 is a diagram schematically illustrating an exemplary fringe pattern observed at a detector of the tilt sensor shown in FIG. 1, when a first exemplary scale is employed as a target surface.

FIG. 13 is a diagram schematically illustrating an exemplary fringe pattern observed at the detector 80 of the tilt sensor 100 shown in FIG. 1, when a first exemplary scale is employed as the target surface. The first exemplary scale may comprise a flat background portion with a plurality of scale features corresponding to the plurality of circular areas contained within a plurality of ellipse-shaped fringe patterns 135 shown in the fringe pattern of FIG. 13, arranged at known spacings or positions thereon. The scale features may comprise circles that have flat surfaces that are raised relative to the flat background portion, for example, by about one quarter of the wavelength of the coherent light that is transmitted from the point or line sources. Thus, the optical path length from the point or line source to the background portion of the target surface scale and then to the detector may be approximately one half wavelength longer than the optical path length from the point or line source to the raised scale features of the target surface scale and then to the detector. It will be appreciated that the fringe field created by the point or line sources creates fringes that extend approximately perpendicular to the line joining point sources, or approximately parallel to the line sources, and approximately normal to the nominal plane of an untilted target surface or scale. Thus, along a given fringe line, the intensity reflected by the circular raised scale features is nominally the same as the intensity reflected by the background portion along that same fringe line, as shown in FIG. 13. The fringe spacing in the circular raised scale features may be negligibly different than the fringe spacing in the background portion, because the overall optical path length is negligibly different. However, at the edges of the raised scale portions, light rays from one of the coherent point or line sources (e.g., 10a) may reflect from the background portion and light rays from the other of the coherent point or line sources (e.g., 10b) may reflect from the raised scale portion. When such light rays interfere after reflection, there may be an additional optical path difference of one half the wavelength (due to the one quarter wavelength height of the raised scale features), and the fringe pattern may therefore be shifted by 180 degrees of phase difference at the edges of the raised circular scale features. As a result, the ellipse-shaped fringe patterns 135 may be formed. Alternatively, the scale features described above may be lowered by one quarter wavelength relative to the background, rather than raised, and ellipse-shaped fringe patterns analogous to the ellipse-shaped fringe patterns 135 may result. The ellipse-shaped fringe patterns 135 may be found in the image using known image processing edge-finding techniques, and their locations determined based on fitting ellipses to the edges found in the image. From the image locations of the scale features, the amount of rotation of the scale about the axis normal to its surface (yaw) may be found. In addition, the translation of the scale along orthogonal X and Y axes that may be parallel to the plane of a nominally untilted target surface may be determined. Various signal processing techniques usable to determine such rotations and translations based on the locations of the scale features in an image, and/or a succession of images, may be understood with reference to U.S. patent application Ser. No. 10/808,849, filed Mar. 25, 2004, which is incorporated herein by reference in its entirety.

Figure 15:
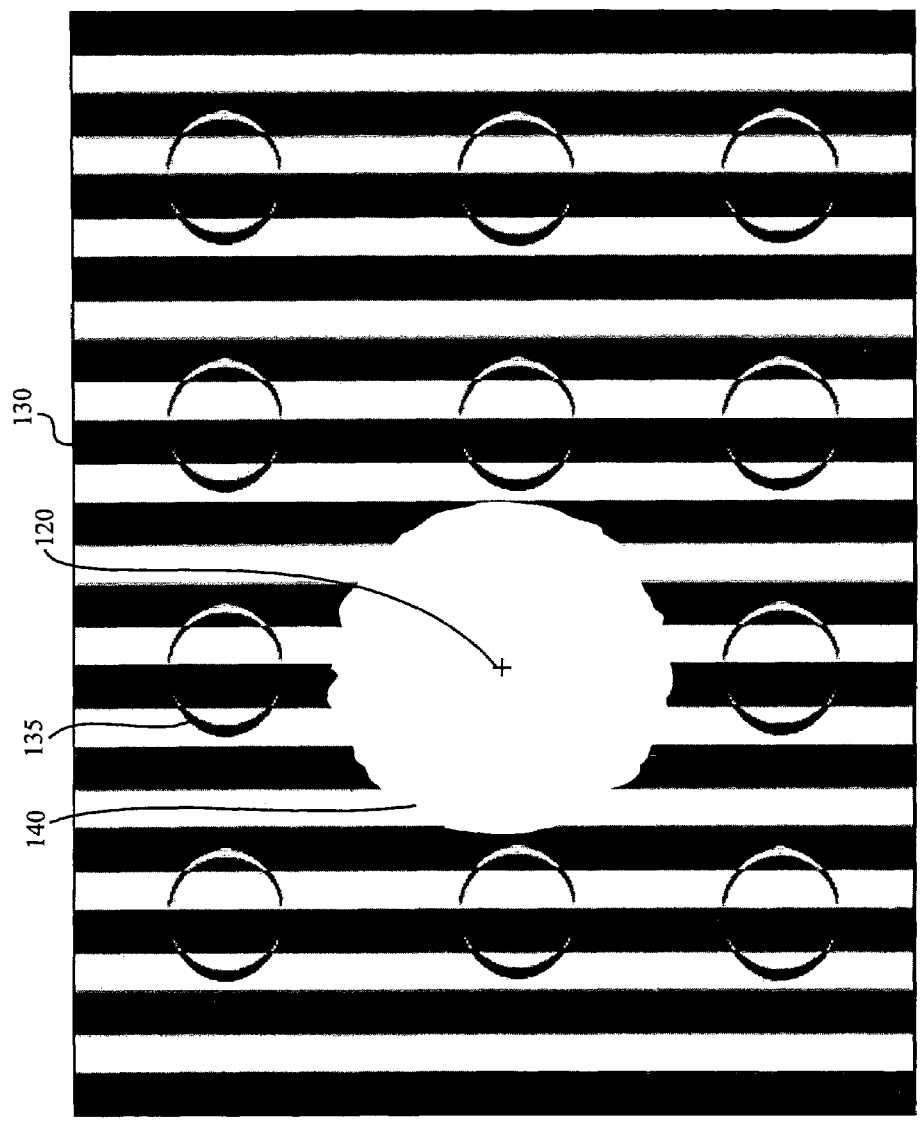
FIG. 15 is a diagram schematically illustrating an exemplary image including the fringe pattern shown in FIG. 13, as well as the location of a partially transmitted beam.

FIG. 15 is a diagram schematically illustrating an exemplary image including the fringe pattern and scale feature images shown in FIG. 13, as well as the location of a partially transmitted beam. It will be understood that the location of the partially transmitted beam, and the pitch of the fringe pattern 130 may be determined as previously described, such that pitch, roll and distance or range (along the Z axis) to the scale may be determined in addition to yaw and X and Y position or displacement. Thus, when a suitable scale is used as a target surface to produce an image analogous to the image shown in FIG. 15, the position or displacement of the scale may be determined for 3 rotational, and 3 translational, degrees of freedom In other embodiments, the raised scale features need not be circular, but may be any desired shape, or combination of shapes. However, in embodiments in which the yaw of the scale is variable, it may be preferred to employ a circular or octagonal, rather than square, scale portion so that the straight edges of a square scale feature or the like are not obscured by, or confused with the straight fringe edges in an image. In some embodiments, the scale portions may alternatively be formed of substantially non-reflective or even completely non-reflective material, in order to create a detectable scale feature in the image. The background portion may be formed of a substantially reflective or even a completely reflective material. In such embodiments, the detected pattern may not include fringes at positions corresponding to the scale portions.

Figure 14:
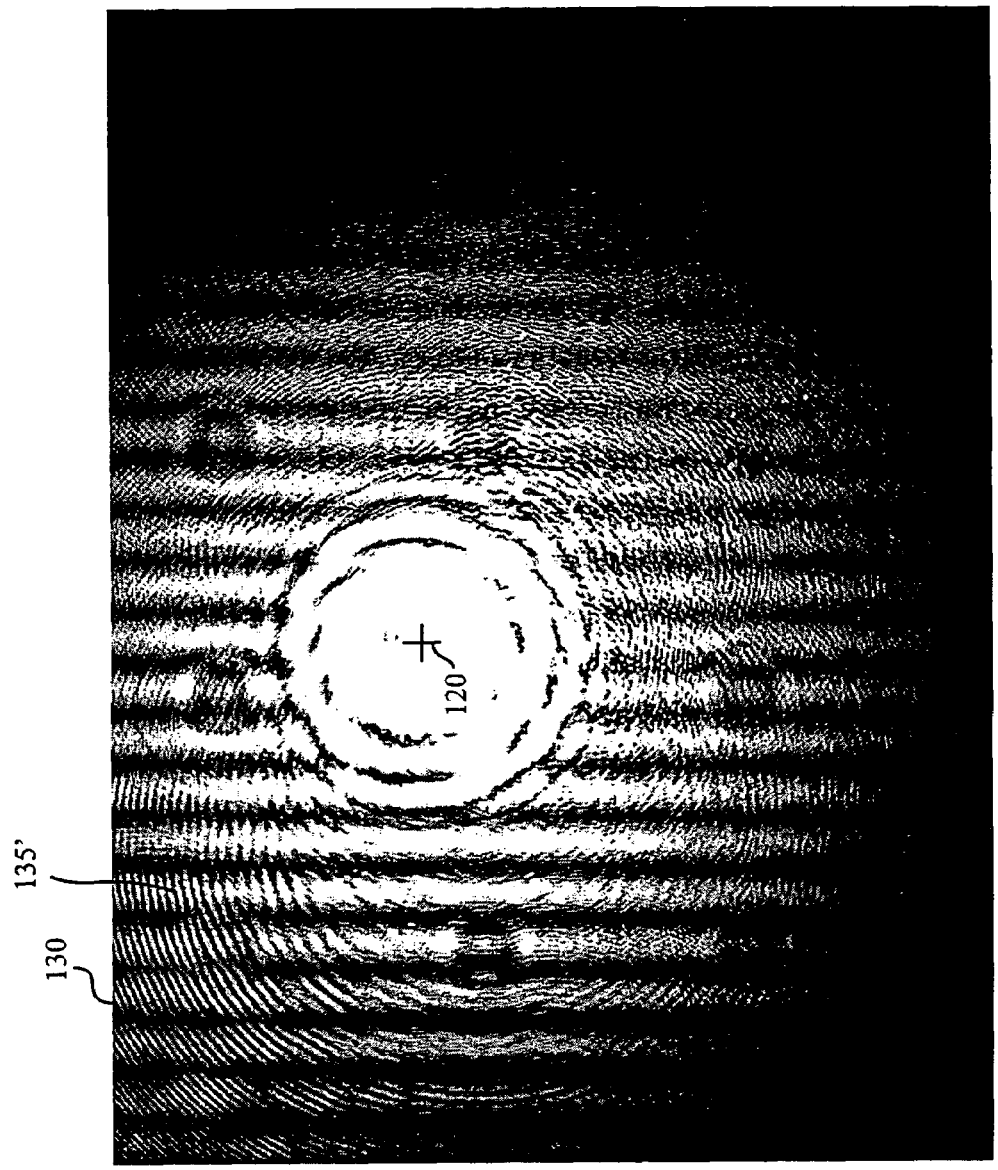
FIG. 14 is an image obtained at the detector of a tilt sensor similar to that shown in FIG. 1, when a second exemplary scale is employed as a target surface.
Figure 16:
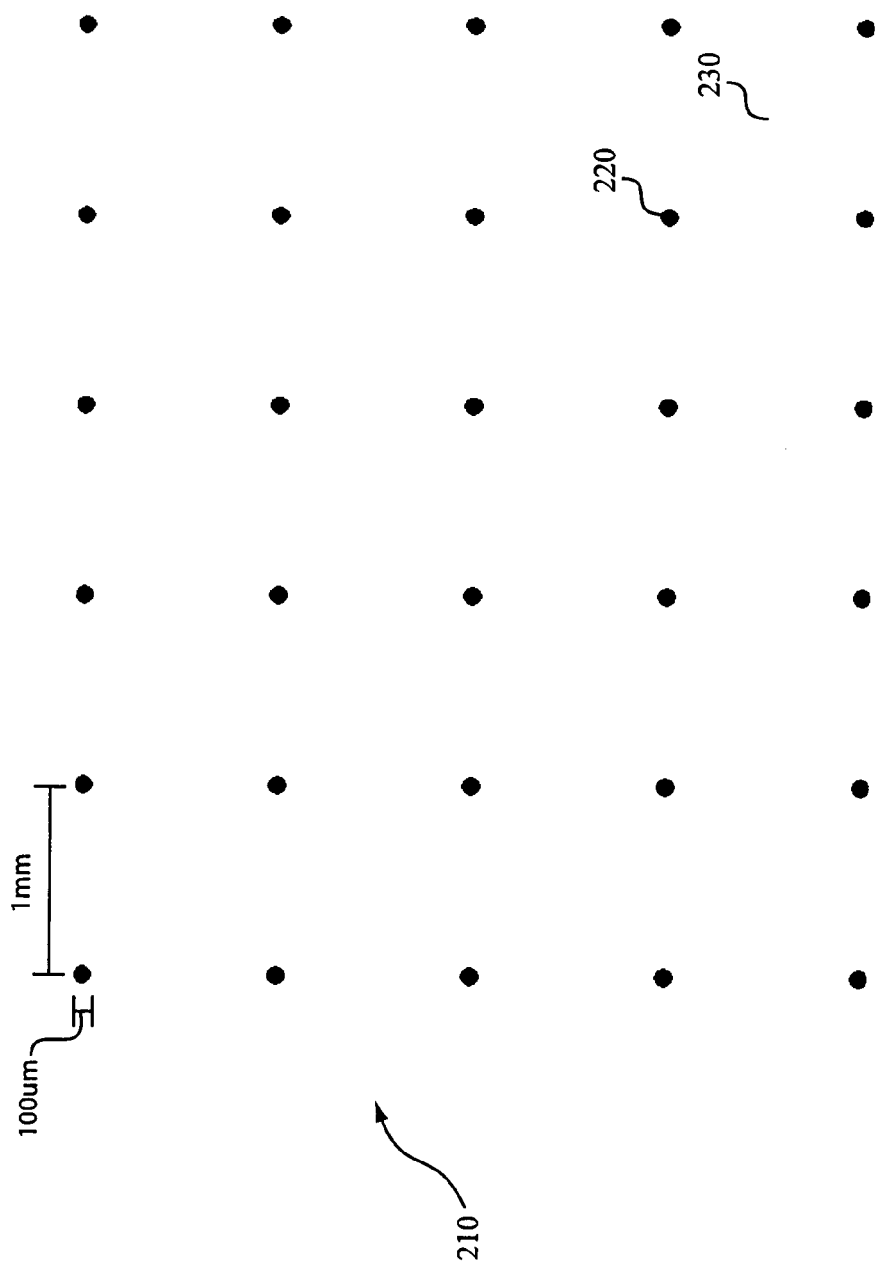
FIG. 16 is a diagram of an exemplary surface of a second exemplary scale useable to produce the image shown in FIG. 14.

FIG. 14 is an exemplary image obtained at the detector 80 of the tilt sensor 100 shown in FIG. 1, when a second exemplary scale, the scale 210 of FIG. 16, is employed as the target surface. The scale 210, shown in FIG. 16, may include scale features 220 that may be formed of a substantially transmissive material or even a completely transmissive material (such as bare glass) or an absorptive material (such as an absorptive black material), while the background surface 230 may be formed of a substantially reflective or even a completely reflective material (such as a chrome or aluminum or gold thin film on glass.) The scale features 220 shown in FIG. 16 have a diameter of about 10 µm, and are arranged at a pitch of about 1 mm. However, in exemplary embodiments the scale features 220 may have a larger size, for example about 100-400 µm, and may be arranged at a desired known spacing in similarly spaced or differently spaced orthogonal rows and columns, for example.

In contrast to FIGS. 11 and 12, FIG. 14 is not a negative image. Otherwise, although generated by an "amplitude" effect rather than a "phase" effect, the various image features shown in FIG. 14, arising from the scale 210, may be used in a manner analogous to those shown and described with reference to FIGS. 11-13 and FIG. 15.

In addition to the foregoing embodiments, more generally, scale features may be sized and arranged such that the scale feature patterns in the image extend over approximately 3-5 fringes when the target surface is located at a nominal distance from the readhead, and approximately 12-20 scale feature patterns appear in the image. In such a case, image processing operations that locate the scale features in the image may be relatively simplified or may have improved reliability.

In exemplary embodiments, the image processing operations that locate the scale features in the image may include filtering and/or template matching operations. In such embodiments, when the nominal fringe pitch is different from the size and spacing of the scale feature patterns, the fringes may be more easily filtered from the image to reveal the scale feature patterns more clearly in the image, for example, for further analysis. When a greater number of scale feature patterns appear in the image, in exemplary embodiments, a template may be registered to fit to the scale feature patterns with better "averaging," such that analysis of the registered template position may lead to a better estimate of the translation and orientation of the scale feature patterns and the related target surface translation and orientation. Alternatively, any other suitable now-known or later developed method may be used that is suitable for locating the scale features in the image.

One potential disadvantage of including scale features on the target surface is that such features may obscure or distort a portion of the transmitted beam spot that is to be used for tilt determination. Therefore, in exemplary embodiments in which scale features are included on the target surface, using relatively smaller scale features, and/or configuring the readhead such that the transmitted beam is not focused at a distance from the readhead that is near a typical operating distance to the target surface, may help avoid or reduce tilt measurement errors that may be associated with a partial obscuration or distortion of the transmitted beam that is used for tilt determination.

Alternatively, in exemplary embodiments that include a readhead in which the coherent light and the light that provides the beam spot may be provided independently, such as the readhead of the tilt sensor configuration 100' shown in FIG. 3, the scale features and operation of the tilt sensor configuration may be as follows. In one operation, the coherent light may be turned on while the light that provides the beam spot is turned off, and the resulting fringe image may be analyzed as previously described. In another operation, the coherent light may be turned off while the light that provides the beam spot is turned on, and the resulting beam spot image may be analyzed as previously described. The scale features may be fabricated such that the features provide little or no image on the detector when illuminated by the coherent light. For example, the scale features may comprise low-contrast colored dots, or the like. However, the scale features may be fabricated to create a significant image on the detector when illuminated by the light that provides the beam spot. In such a case, the scale features may be both significantly smaller and significantly more numerous, and still be easily located in the detector image when properly illuminated by the light that provides the beam spot. Furthermore, the scale features may be configured such that any disturbance to the beam spot caused by such smaller and more numerous scale features individually may tend to average out over several such scale features across the beam spot, such that the beam spot location may still be determined with relatively high accuracy. Using a laser diode for the coherent light source and a suitable LED for the light that provides the beam spot, it may be practical to acquire both of the images required to perform the respective operations related to the respective light sources within a very short time, which may generally be as short as allowed by the sensitivity and/or the required exposure time of the detector, for example, on the order of several milliseconds, or less. The operations outlined above may also be used in embodiments in which the target surface does not include scale features.

Figure 17:
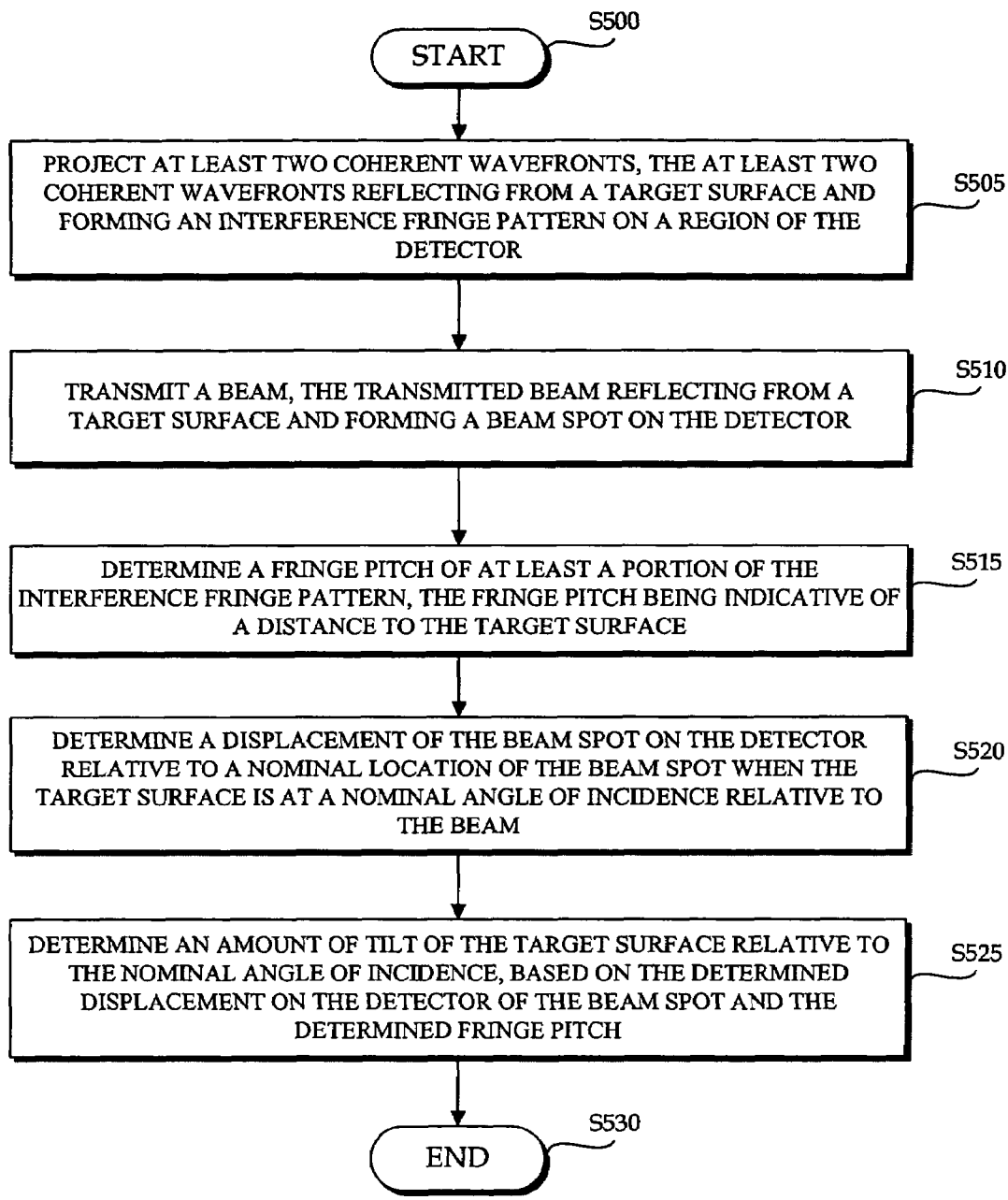
FIG. 17 is a flow chart of an exemplary method for determining an amount of tilt according to one or more aspects of the invention.

FIG. 17 is a flow chart of an exemplary method for determining an amount of tilt. The process may begin at step S500 and may proceed to step S505 during which at least two coherent wavefronts may be transmitted to reflect from a target surface and create an interference fringe pattern on a detector. Next, the process may proceed to step S510 during which a beam may be transmitted to reflect from a target surface and form a beam spot on the detector. During step S515, a fringe pitch of at least a portion of the interference fringe pattern on the detector may be determined. The fringe pitch may be indicative of a distance to the target surface. Next, the process may proceed to step S520 during which a displacement of the beam spot on the detector may be determined, for example, relative to a nominal location of the beam spot when the target surface is at a nominal angle of incidence relative to the beam. Next, the process may proceed to step S525 during which an amount of tilt of the target surface relative to the nominal angle of incidence may be determined, for example, based on the determined displacement of the beam spot on the detector and the determined fringe pitch. The process may end in step S530.

Various aspects of the invention described above may be realized separately, or in combination. Various aspects of the invention described above with regard to exemplary embodiments may be applied to a sensor for measuring or mapping a surface profile of various objects. The surface to be profiled may be understood as a plurality of portions that provide contiguous "target surfaces" that may be measured for distance (height) and/or tilt based on one or more images, as outlined above, to determine the surface profile.

While the various aspects of the invention have been described in conjunction with exemplary embodiments outlined above, many alternatives, modifications and variations will be apparent to those skilled in the art. Accordingly, the exemplary embodiments set forth above are intended to be illustrative and not limiting. Various changes may be made without departing from the spirit and scope of the invention.

What is claimed is:

1. A method of determining an amount of tilt, comprising:
projecting at least two coherent wavefronts to a target surface, the target surface reflecting the at least two coherent wavefronts to form an interference fringe pattern on a detector;
transmitting a beam to the target surface, the target surface reflecting the transmitted beam to form a beam spot on the detector;
determining a fringe pitch of at least a portion of the interference fringe pattern, the fringe pitch being indicative of a distance to the target surface;
determining a displacement of the beam spot on the detector relative to a nominal location of the beam spot when the target surface is at a nominal angle of incidence relative to the beam; and
determining an amount of tilt of the target surface relative to the nominal angle of incidence based on the determined displacement of the beam spot on the detector and the determined fringe pitch.

2. The method of claim 1, wherein projecting at least two coherent wavefronts, comprises one of projecting at least two approximately spherical wavefronts and projecting at least two approximately cylindrical wavefronts.

3. The method of claim 1, wherein the nominal angle of incidence is normal to the target surface and the at least two coherent wavefronts are reflected from a respective region of the target surface that generally surrounds a region of the target surface that reflects the transmitted beam when the target surface is not tilted relative to the nominal angle of incidence.

4. The method of claim 3, further comprising:
controlling a first light source to be on and a second light source to be off at a first time that corresponds to projecting the least two coherent wavefronts to a target surface and creating the interference fringe pattern on a detector; and
controlling the first light source to be off and the second light source to be on at a second time that corresponds to transmitting the beam to the target surface and forming a beam spot on the detector.

5. The method of claim 1, wherein the detector comprises a two-dimensional array of pixels and determining the fringe pitch comprises:
determining a one-dimensional projection of pixel intensities corresponding to the fringe pattern;
performing a Fourier transform on the one dimensional projection; and
determining the fringe pitch based on a location of a peak of the Fourier transform.

6. The method of claim 5, wherein determining a one-dimensional projection of pixel intensities corresponding to the fringe pattern further comprises zero-padding the one-dimensional projection to provide at least 1024 data points.

7. The method of claim 5, wherein determining the fringe pitch based on a location of a peak of the Fourier transform comprises at least one of determining the location of the peak based on determining a location of a centroid of an area included in the peak of the Fourier transform, and fitting a curve to the peak of the Fourier transform and determining the location of the peak based on determining the location of a peak of the fitted curve.

8. The method of claim 1, wherein determining the displacement of the beam spot comprises determining a centroid of an intensity distribution corresponding to the beam spot.

9. The method of claim 1, wherein projecting at least two coherent wavefronts comprises directing the transmitted beam through a partially transmissive mask including at least two apertures, the at least two apertures comprising one of slit apertures and pinhole apertures.

10. The method of claim 1, wherein a semiconductor wafer is used to provide the target surface.

11. The method of claim 1, wherein at least one of a translation and a yaw of the target surface is determined, the method further comprising:
 providing at least one scale feature on the target surface, the scale feature giving rise to at least one scale feature pattern on the detector;
 performing a first image processing operation that enhances the visibility of the at least one scale feature pattern;
 performing a second image processing operation that determines at least one of a location and an orientation of the at least one scale feature pattern after the first image processing operation is performed; and
 determining at least one of the translation and the yaw based on the results of the second image processing operation.

12. The method of claim 1, further comprising controlling a coherent light source that provides the light for at least the two coherent wavefronts such that a wavelength of the light source varies during an exposure period corresponding to the collection of the light by the detector, such that the contrast of at least some optical noise features otherwise present at the detector is reduced.

13. A readhead of a tilt sensor, including:
 a light source configured to generate a light beam,
 a mask including a plurality of apertures, the apertures forming a plurality of coherent wavefronts when the mask is illuminated by the light beam, the light beam and the formed coherent wavefronts being directed toward a target surface, and the mask being configured to partially transmit the light beam generated by the light source through a region of the mask surrounding the apertures;
 a beam splitter arranged to receive light reflected from the target surface;
 a detector; and
 a signal processing and control circuit connected to at least the detector, wherein:
 the beam splitter directs light reflected from the target surface toward the detector, the light directed toward the detector forms a pattern of interference fringes arising from the coherent wavefronts and a beam spot arising from the light beam partially transmitted through the mask, and the signal processing and control circuit is configured to process data from the detector to determine a fringe pitch of at least a portion of the pattern of interference fringes and a location of the beam spot, and to determine an amount of tilt of the target surface based on the determined fringe pitch and beam spot location.

14. The sensor of claim 13, wherein each aperture comprises one of a pinhole aperture having a diameter of at least 5 μm and at most 20 μm and a slit aperture having a slit width of at least 5 μm and at most 20 μm.

15. The sensor of claim 14, wherein a separation distance between centers of the apertures is at least 50 μm and at most 500 μm.

16. The sensor of claim 15, wherein, when the apertures comprise pinhole apertures, the plurality of pinhole apertures comprises at least 3 apertures arranged to form at least three corners of a rectangle and, when the apertures comprise slit apertures, the plurality of slit apertures comprises at least 4 apertures arranged to form at least two apertures that are parallel along a first direction and at least two apertures that are parallel along a second direction that is orthogonal to the first direction.

17. The sensor of claim 13, wherein the beam splitter comprises a polarized beam splitter and the readhead includes a quarter wave plate located between the beam splitter and the target surface.

18. The sensor of claim 13 further comprising at least one optical element between the light source and the mask, the at least one optical element being configured to create a slightly converging light beam at the plane of the mask.

19. The sensor of claim 13, wherein the target surface includes a plurality of scale features.

20. A readhead of a tilt sensor, including:
 a first light source configured to generate a light beam directed toward a target surface;
 a plurality of optical fibers connected to a light source, the optical fibers having ends configured to form a plurality of coherent wavefronts directed toward the target surface;
 a beam splitter arranged to receive light reflected from the target surface;
 a detector; and
 a signal processing and control circuit connected to at least the detector, wherein:
 the beam splitter directs light reflected from the target surface toward the detector, the light directed toward the detector forms a pattern of interference fringes arising from the coherent wavefronts and a beam spot arising from the light beam, and the signal processing and control circuit is configured to process data from the detector to determine a fringe pitch of at least a portion of the pattern of interference fringes and a location of the beam spot, and to determine an amount of tilt of the target surface based on the determined fringe pitch and beam spot location.

* * * * *